US012786676B2

(12) United States Patent
Wang

(10) Patent No.: US 12,786,676 B2
(45) Date of Patent: Nov. 3, 2026

(54) FILE TRANSFER METHOD AND SYSTEM, ELECTRONIC DEVICE, AND STORAGE MEDIUM

(71) Applicant: Huawei Technologies Co., Ltd., Shenzhen (CN)

(72) Inventor: Chunfeng Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 18/523,546

(22) Filed: Nov. 29, 2023

(65) Prior Publication Data

US 2024/0107283 A1 Mar. 28, 2024

Related U.S. Application Data

(63) Continuation of application No. PCT/CN2022/085091, filed on Apr. 2, 2022.

(30) Foreign Application Priority Data

May 31, 2021 (CN) ........................ 202110605128.0

(51) Int. Cl.
*H04W 4/80* (2018.01)
*H04B 5/20* (2024.01)

(52) U.S. Cl.
CPC ................ *H04W 4/80* (2018.02); *H04B 5/20* (2024.01)

(58) Field of Classification Search
CPC ....... H04W 4/80; H04W 12/03; H04W 12/04; H04B 5/20; H04L 67/104; H04L 67/06
See application file for complete search history.

(56) References Cited

U.S. PATENT DOCUMENTS

| | | | | |
|---|---|---|---|---|
| 2010/0251007 A1* | 9/2010 | Moore | H04L 69/40 | 714/E11.131 |
| 2014/0019496 A1* | 1/2014 | Chiu | H04L 69/14 | 707/827 |
| 2015/0304843 A1* | 10/2015 | Hillyard | G06F 8/654 | 726/5 |

FOREIGN PATENT DOCUMENTS

| | | |
|---|---|---|
| CN | 101217295 B | 10/2011 |
| CN | 102299961 A | 12/2011 |
| CN | 105245612 A | 1/2016 |
| CN | 105450769 A | 3/2016 |
| CN | 104363271 B | 1/2018 |
| CN | 109379730 A | 2/2019 |
| CN | 109783463 A | 5/2019 |
| CN | 111447276 A | 7/2020 |

(Continued)

*Primary Examiner* — Ayodeji O Ayotunde
(74) *Attorney, Agent, or Firm* — Slater Matsil, LLP

(57) ABSTRACT

In accordance with an embodiment, a method includes obtaining, by a transmitter, at least one to-be-transferred file, where the to-be-transferred file is a file to be sent to a receiver that establishes a near-field communication connection to the transmitter; sending, by the transmitter, the to-be-transferred file to the receiver; in response to a file transfer being interrupted, determining, by the transmitter, whether at least one file of the interrupted file transfer that has not completed transfer has changed; and in response to a determination that the at least one file of the interrupted file transfer that has not completed transfer is unchanged, resuming, by the transmitter, the transfer from a breakpoint at which the file transfer is interrupted.

20 Claims, 15 Drawing Sheets

(56) References Cited

FOREIGN PATENT DOCUMENTS

| | | | |
|---|---|---|---|
| CN | 111629036 | A | 9/2020 |
| TW | 201308946 | A | 2/2013 |

* cited by examiner

FILE TRANSFER METHOD AND SYSTEM, ELECTRONIC DEVICE, AND STORAGE MEDIUM

CROSS-REFERENCE TO RELATED APPLICATIONS

This application is a continuation of International Application No. PCT/CN2022/085091, filed on Apr. 2, 2022, which claims priority to Chinese Patent Application No. 202110605128.0, filed on May 31, 2021. The disclosures of the aforementioned applications are hereby incorporated by reference in their entireties.

TECHNICAL FIELD

Embodiments of this application relate to the field of data transmission, and in particular, to a file transfer method and system, an electronic device, and a storage medium.

BACKGROUND

Near-field file transfer means a process of file transfer between two terminal devices in near-field communication. For example, a device 1 may discover a device 2 through Bluetooth, negotiate a related peer-to-peer (P2P) parameter with the device 2 on a Bluetooth channel, and establish a high-speed P2P channel (also referred to as a link) with the device 2. Then the device 1 may transfer a file to the device 2 through the P2P channel.

Currently, near-field file transfer between terminal devices does not support resumable transfer. The resumable transfer means that when a file is transferred between terminal devices, if the file transfer is interrupted (when the file transfer is interrupted, a connection between the terminal devices may or may not be disconnected), the terminal devices may resume the transfer of the file from a point (that is, a breakpoint) at which the file transfer is interrupted.

SUMMARY

Embodiments of this application provide a file transfer method and system, an electronic device, and a storage medium, and may be applicable to a scenario in which a transmitter transfers a file to a receiver. In the method, when the transmitter transfers the file to the receiver, resumable transfer may be supported.

According to a first aspect, an embodiment of this application provides a file transfer method. The method is applied to a transmitter. The method includes: The transmitter obtains at least one to-be-transferred file, where the to-be-transferred file is a file that needs to be sent to a receiver that establishes a near-field communication connection to the transmitter; the transmitter sends the to-be-transferred file to the receiver; when file transfer is interrupted and resumed, the transmitter determines whether at least one file that needs to continue to be transferred are changed; and when the at least one file that needs to continue to be transferred is not changed, the transmitter resumes the transfer from a breakpoint at which the file transfer is interrupted.

The file transfer method may be applicable to a scenario in which a transmitter transfers a file to a receiver in near field. In the method, when the transmitter transfers the file to the receiver, resumable transfer may be supported.

Optionally, that the transmitter determines whether at least one file that needs to continue to be transferred is changed includes: The transmitter identifies whether each of the at least one file that needs to continue to be transferred is changed, whether there is a file deleted from the at least one file that needs to continue to be transferred, and whether there is a file added to the at least one file that needs to continue to be transferred.

That the at least one file that needs to continue to be transferred is not changed includes: each of the at least one file that needs to continue to be transferred is not changed, and there is no file deleted from or added to the at least one file that needs to continue to be transferred.

In a possible implementation, that the transmitter identifies whether each of the at least one file that needs to continue to be transferred is changed includes:

For each of the at least one file that needs to continue to be transferred, the transmitter identifies whether a file time of the file at a start of a transfer resumption is the same as a file time of the file before sending of the to-be-transferred file to the receiver; and when the file time of the file at a start of the transfer resumption is the same as the file time of the file before the sending of the to-be-transferred file to the receiver, the transmitter determines that the file is not changed; or when the file time of the file at a start of the transfer resumption is different from the file time of the file before the sending of the to-be-transferred file to the receiver, the transmitter determines that the file is changed.

Optionally, that the at least one file that needs to continue to be transferred is changed includes one or more of the following cases: one or more of the at least one file that needs to continue to be transferred is changed; there are one or more files deleted from the at least one file that needs to continue to be transferred; or there are one or more files added to the at least one file that needs to continue to be transferred.

In a possible implementation, the at least one file that needs to continue to be transferred includes a file whose transfer is interrupted and a file whose transfer has not started. Alternatively, in another possible implementation, the at least one file that needs to continue to be transferred includes only a file whose transfer is interrupted.

For example, the file whose transfer is interrupted is a first file, and the file whose transfer has not started includes a second file. The method further includes: when the at least one file that needs to continue to be transferred is changed, the transmitter continues to transfer the file to the receiver according to the following logic.

For the first file, if the first file is not deleted or changed, the transmitter resumes the transfer of the first file from a breakpoint of the first file; if the first file is deleted, the transmitter skips the first file and sends, to the receiver, the remaining file whose transfer has not started; or if the first file is not deleted but is changed, the transmitter re-sends a changed first file to the receiver.

For the second file, if the second file is not deleted or changed, the transmitter sends the second file to the receiver when the second file is subsequently transferred; if the second file is not deleted but is changed, the transmitter sends a changed second file to the receiver when the second file is subsequently transferred; if the second file is deleted, the transmitter skips sending the second file to the receiver; or if the second file is an added file, the transmitter sends the second file to the receiver.

Optionally, when the at least one file that needs to continue to be transferred is changed, before the transmitter continues to transfer the file to the receiver, the method further includes: The transmitter displays first information, where the first information includes change information about a change of the at least one file that needs to continue to be transferred; and the transmitter receives an acknowledgment of starting to resume the transfer. That the transmitter continues to transfer the file to the receiver includes: The transmitter continues to transfer the file to the receiver in response to the acknowledgment of starting to resume the transfer.

Optionally, that the transmitter sends the to-be-transferred file to the receiver includes: The transmitter copies the to-be-transferred file to a first buffer; and the transmitter sends the to-be-transferred file in the first buffer to the receiver.

Optionally, the method further includes: The transmitter sends a capability query request message to the receiver; and the transmitter receives a resumable transfer capability acknowledgment message from the receiver, where the resumable transfer capability acknowledgment message indicates that the receiver has a capability of supporting resumable transfer.

In a possible design, the transmitter is configured with a first resumable transfer tolerance time, and the receiver is configured with a second resumable transfer tolerance time; and the method further includes: The transmitter and the receiver determine a target resumable transfer tolerance time based on the first resumable transfer tolerance time and the second resumable transfer tolerance time.

The target resumable transfer tolerance time is greater than or equal to a smaller value of the first resumable transfer tolerance time and the second resumable transfer tolerance time, and is less than or equal to a larger value of the first resumable transfer tolerance time and the second resumable transfer tolerance time.

When file transfer is interrupted, the transmitter stores first transmission information, where the first transmission information includes one or more of related information of the receiver, a file list of the to-be-transferred file, a file whose transfer has been completed, a file that needs to continue to be transferred, and breakpoint information. The transmitter deletes the first transmission information when interruption duration of file transfer reaches the target resumable transfer tolerance time.

In this design, the target resumable transfer tolerance time may indicate a maximum waiting time for the transmitter and the target receiver to delete respectively buffered transfer files after the file transfer is interrupted. It should be understood that, when the target resumable transfer tolerance time is permanent, the transmitter does not delete the first transmission information.

Optionally, the transmitter includes the file list of the to-be-transferred file, and the method further includes: when the to-be-transferred file is changed, the transmitter identifies, in the file list, change information about the to-be-transferred file.

That the transmitter determines whether at least one file that needs to continue to be transferred is changed when file transfer is interrupted and resumed includes: When file transfer is interrupted and resumed, the transmitter determines, based on the file list, whether the at least one file that needs to continue to be transferred is changed.

Optionally, the method further includes: When the to-be-transferred file is changed, the transmitter sends, to the receiver, the change information about the to-be-transferred file.

In a possible implementation, the file transfer interruption includes: the file transfer is interrupted, and the transmitter is not disconnected from the receiver. Alternatively, in another possible implementation, the file transfer interruption includes: the file transfer is interrupted, and the transmitter is disconnected from the receiver.

When the file transfer is interrupted, the transmitter is disconnected from the receiver, and the transfer is resumed, the method further includes: The transmitter identifies whether a receiver for starting to resume the transfer and a receiver before the file transfer is interrupted are a same device.

That the transmitter resumes the transfer from a breakpoint at which the file transfer is interrupted includes: When the receiver for starting to resume the transfer and the receiver before the file transfer is interrupted are the same device, the transmitter resumes the transfer from the breakpoint at which the file transfer is interrupted.

When the file transfer is interrupted, the transmitter is disconnected from the receiver, and the transfer is resumed between the transmitter and the receiver, when the transmitter identifies that the receiver for current resumable transfer and the receiver to which a connection is established when the file transfer starts last time are the same device, the transmitter performs a subsequent resumable transfer procedure. This prevents communication security from being affected by a new accessed device (a device that establishes a connection to the transmitter) from being spoofed after the file transfer is interrupted.

For example, when file transfer is interrupted for 15 minutes, if a BLE address of a new connected device is changed, the transmitter can still accurately identify that a target receiver for current resumable transfer and a target receiver to which a connection is established when file transfer starts last time are the same device, and start a subsequent resumable transfer procedure.

In a possible implementation, before the transmitter sends the to-be-transferred file to the receiver, the method further includes: The transmitter receives a public key of the receiver. That the transmitter identifies whether a receiver for starting to resume the transfer and a receiver before the file transfer is interrupted are a same device includes: The transmitter receives a public key of the receiver for starting to resume the transfer; and the transmitter identifies whether the public key of the receiver that is received before the to-be-transferred file is sent to the receiver is consistent with the public key of the receiver for starting to resume the transfer. If the public keys are consistent, the transmitter determines that the receiver for starting to resume the transfer and the receiver before the file transfer is interrupted are the same device; or if the public keys are inconsistent, the transmitter determines that the receiver for starting to resume the transfer and the receiver before the file transfer is interrupted are different devices.

Optionally, when the file transfer is interrupted, the transmitter is disconnected from the receiver, and the transfer is resumed, before the transmitter determines whether at least one file that needs to continue to be transferred is changed, the method further includes: The transmitter reestablishes a near-field communication connection to the receiver; the transmitter sends, to the receiver, breakpoint information about a breakpoint at which the file transfer is interrupted; and the transmitter receives an acknowledgment message for the breakpoint information from the receiver.

Optionally, before the transmitter sends the to-be-transferred file to the receiver, the method further includes: The transmitter sends a first indication message to the receiver, where the first indication message indicates that a current connection is a new connection; and the transmitter receives an acknowledgment message for the first indication message from the receiver.

Optionally, before the transmitter resumes the transfer from a breakpoint at which the file transfer is interrupted, the method further includes: The transmitter sends a second indication message to the receiver, where the second indication message indicates that the current connection is a breakpoint-based connection; and the transmitter receives an acknowledgment message for the second indication message from the receiver.

Optionally, before the transmitter sends the to-be-transferred file to the receiver, the method further includes: The transmitter sends basic information of the to-be-transferred file to the receiver; and the transmitter receives an acknowledgment message for the basic information of the to-be-transferred file from the receiver.

In some embodiments, the near-field communication connection between the transmitter and the receiver includes a Bluetooth connection, a Wi-Fi connection, a Zigbee connection, an infrared connection, or a USB connection. More specifically, for example, the connection may be a Bluetooth low energy connection, a Bluetooth basic rate connection, a Bluetooth enhanced connection, a Wi-Fi local area network connection, a Wi-Fi P2P connection, another wireless connection like a zigbee connection or an infrared connection, or a wired connection like a USB connection or an Ethernet connection.

Optionally, the method further includes: The transmitter receives an operation of deleting a third file, where the third file is the file that needs to continue to be transferred; and the transmitter displays a first prompt message, where the first prompt message prompts that the third file is being shared.

According to a second aspect, an embodiment of this application provides a file transfer apparatus. The apparatus may be applied to a transmitter, and is configured to implement the file transfer method according to the first aspect. The function of the apparatus may be implemented by hardware, or may be implemented by hardware executing corresponding software. The hardware or the software includes one or more modules or units corresponding to the foregoing functions. For example, the apparatus may include a sending unit, a receiving unit, and a processing unit. The sending unit, the receiving unit, and the processing unit may be configured to cooperate to implement the file transfer method according to the first aspect. For example, the sending unit may be configured to send data to a receiver, the receiving unit may be configured to receive data from the receiver, and the processing unit may be configured to identify a device change, a file change, and the like.

According to a third aspect, an embodiment of this application provides an electronic device, including a processor, a memory, and a computer program. The computer program is stored in the memory, and when the computer program is executed by the processor, the electronic device is enabled to implement the method according to any one of the first aspect or the possible implementations of the first aspect.

According to a fourth aspect, an embodiment of this application provides a computer-readable storage medium. The computer-readable storage medium includes a computer program, and when the computer program is run on an electronic device, the electronic device is enabled to implement the method according to any one of the first aspect or the possible implementations of the first aspect.

According to a fifth aspect, an embodiment of this application further provides a computer program product, including computer-readable code. When the computer-readable code is run in an electronic device, the electronic device is enabled to implement the method according to any one of the first aspect or the possible implementations of the first aspect.

For beneficial effects of the second aspect to the fifth aspect, refer to the descriptions in the first aspect. Details are not described herein again.

According to a sixth aspect, an embodiment of this application provides a file transfer method. The method is applied to a receiver, and the method includes: The receiver receives a file from a transmitter, and the receiver establishes a near-field communication connection to the transmitter; and when file transfer is interrupted, the receiver waits for the file to be sent by the transmitter.

Optionally, that the receiver receives a file from a transmitter includes: The receiver copies the file from the transmitter to a second buffer, and the receiver stores the file in the second buffer after receiving all files from the transmitter.

Optionally, the method further includes: The receiver receives a capability query request message from the transmitter; and the receiver returns a resumable transfer capability acknowledgment message to the transmitter, where the resumable transfer capability acknowledgment message indicates that the receiver has a capability of supporting resumable transfer.

In a possible design, the transmitter is configured with a first resumable transfer tolerance time, and the receiver is configured with a second resumable transfer tolerance time; and the method further includes: The receiver and the transmitter determine a target resumable transfer tolerance time based on the first resumable transfer tolerance time and the second resumable transfer tolerance time.

The target resumable transfer tolerance time is greater than or equal to a smaller value of the first resumable transfer tolerance time and the second resumable transfer tolerance time, and is less than or equal to a larger value of the first resumable transfer tolerance time and the second resumable transfer tolerance time.

When file transfer is interrupted, the receiver stores second transmission information, where the second transmission information includes one or more of related information of the transmitter, a file list of the to-be-transferred file, a file whose transfer has been completed, a file that has not been recovered temporarily, and breakpoint information. The receiver deletes the second transmission information when interruption duration of file transfer reaches the target resumable transfer tolerance time.

Optionally, the method further includes: The receiver receives change information about the to-be-transferred file from the transmitter, and the receiver adjusts the file in the second buffer based on the change information about the to-be-transferred file.

For example, when the change information about the to-be-transferred file includes that a transferred file A is deleted, the receiver may delete the transferred file A from the second buffer.

In a possible implementation, the file transfer interruption includes: the file transfer is interrupted, and the transmitter is not disconnected from the receiver. Alternatively, in another possible implementation, the file transfer interruption includes: the file transfer is interrupted, and the transmitter is disconnected from the receiver.

In a possible implementation, the method further includes: The receiver sends a public key of the receiver to the transmitter.

Optionally, when file transfer is interrupted, the transmitter is disconnected from the receiver, and the transfer is resumed, the method further includes: The receiver re-establishes a near-field communication connection to the transmitter; the receiver receives, from the transmitter, breakpoint information about a breakpoint at which the file transfer is interrupted; and the receiver sends/returns an acknowledgment message for the breakpoint information to the transmitter.

Optionally, the method further includes: The receiver receives a first indication message from the transmitter, where the first indication message indicates that a current connection is a new connection; and the receiver returns an acknowledgment message for the first indication message to the transmitter.

Optionally, the method further includes: The receiver receives a second indication message from the transmitter, where the second indication message indicates that the current connection is a breakpoint-based connection; and the receiver returns an acknowledgment message for the second indication message to the transmitter.

Optionally, the method further includes: The receiver receives basic information of the to-be-transferred file to the receiver; and the receiver returns an acknowledgment message for the basic information of the to-be-transferred file to the transmitter.

In some embodiments, the near-field communication connection between the receiver and the transmitter includes a Bluetooth connection, a Wi-Fi connection, a Zigbee connection, an infrared connection, or a USB connection. More specifically, for example, the connection may be a Bluetooth low energy connection, a Bluetooth basic rate connection, a Bluetooth enhanced connection, a Wi-Fi local area network connection, a Wi-Fi P2P connection, another wireless connection like a zigbee connection or an infrared connection, or a wired connection like a USB connection or an Ethernet connection.

In the sixth aspect, for beneficial effects generated by some steps corresponding to the first aspect, refer to the descriptions in the first aspect. Details are not described again.

According to a seventh aspect, an embodiment of this application provides a file transfer apparatus. The apparatus may be applied to a receiver, and is configured to implement the file transfer method according to the sixth aspect. The function of the apparatus may be implemented by hardware, or may be implemented by hardware executing corresponding software. The hardware or the software includes one or more modules or units corresponding to the foregoing functions. For example, the apparatus may include a sending unit, a receiving unit, and a processing unit. The sending unit, the receiving unit, and the processing unit may be configured to cooperate to implement the file transfer method according to the sixth aspect.

According to an eighth aspect, an embodiment of this application provides an electronic device, including a processor, a memory, and a computer program. The computer program is stored in the memory, and when the computer program is executed by the processor, the electronic device is enabled to implement the method according to any one of the sixth aspect or the possible implementations of the sixth aspect.

According to a ninth aspect, an embodiment of this application provides a computer-readable storage medium. The computer-readable storage medium includes a computer program, and when the computer program is run on an electronic device, the electronic device is enabled to implement the method according to any one of the sixth aspect or the possible implementations of the sixth aspect.

According to a tenth aspect, an embodiment of this application further provides a computer program product, including computer-readable code. When the computer-readable code is run in an electronic device, the electronic device is enabled to implement the method according to any one of the sixth aspect or the possible implementations of the sixth aspect.

For beneficial effects of the seventh aspect to the tenth aspect, refer to the descriptions in the sixth aspect. Details are not described herein again.

According to an eleventh aspect, an embodiment of this application provides a file transfer system, including a transmitter and a receiver, where the transmitter establishes a near-field communication connection to the receiver.

The transmitter is configured to obtain at least one to-be-transferred file, and send the to-be-transferred file to the receiver; and when file transfer is interrupted and resumed, the transmitter is configured to identify whether at least one file that needs to continue to be transferred is changed; and when the at least one file that needs to continue to be transferred is not changed, the transmitter resumes the transfer from a breakpoint at which the file transfer is interrupted.

Optionally, the transmitter is specifically configured to identify whether each of the at least one file that needs to continue to be transferred is changed, whether there is a file deleted from the at least one file that needs to continue to be transferred, and whether there is a file added to the at least one file that needs to continue to be transferred.

That the at least one file that needs to continue to be transferred is not changed includes: each of the at least one file that needs to continue to be transferred is not changed, and there is no file deleted from or added to the at least one file that needs to continue to be transferred.

Optionally, the transmitter is configured with a first resumable transfer tolerance time, and the receiver is configured with a second resumable transfer tolerance time; and the transmitter is further configured to determine, with the receiver, a target resumable transfer tolerance time based on the first resumable transfer tolerance time and the second resumable transfer tolerance time.

The target resumable transfer tolerance time is greater than or equal to a smaller value of the first resumable transfer tolerance time and the second resumable transfer tolerance time, and is less than or equal to a larger value of the first resumable transfer tolerance time and the second resumable transfer tolerance time.

When file transfer is interrupted, the transmitter stores first transmission information, where the first transmission information includes one or more of related information of the receiver, a file list of the to-be-transferred file, a file whose transfer has been completed, a file that needs to continue to be transferred, and breakpoint information. The transmitter deletes the first transmission information when interruption duration of file transfer reaches the target resumable transfer tolerance time.

Optionally, the file transfer interruption includes: the file transfer is interrupted, and the transmitter is not disconnected from the receiver; or the file transfer is interrupted, and the transmitter is disconnected from the receiver.

When the file transfer is interrupted, the transmitter is disconnected from the receiver, and the transfer is resumed, the transmitter is further configured to identify whether a receiver for starting to resume the transfer and a receiver before the file transfer is interrupted are a same device; and the transmitter is specifically configured to: when the receiver for starting to resume the transfer and the receiver before the file transfer is interrupted are the same device, resume the transfer from the breakpoint at which the file transfer is interrupted.

Similarly, in the file transfer system, the transmitter may be configured to implement all functions that can be implemented by the transmitter in the file transfer method according to the first aspect, and the receiver may be configured to implement all functions that can be implemented by the receiver in the file transfer method according to the sixth aspect. Details are not described herein again.

For beneficial effects of the eleventh aspect, refer to the first aspect and the sixth aspect. Details are not described herein again.

It should be understood that, descriptions of technical features, technical solutions, beneficial effects, or similar words in this application do not imply that all features and advantages can be implemented in any individual embodiment. On the contrary, it may be understood that, the descriptions of the features or the beneficial effects mean that at least one embodiment includes a specific technical feature, a technical solution, or a beneficial effect. Therefore, the descriptions of the technical features, the technical solutions, or the beneficial effects in this specification may not necessarily be specific to a same embodiment. Further, the technical features, the technical solutions, and the beneficial effects described in embodiments may be combined in any proper manner. A person skilled in the art may understand that an embodiment may be implemented without one or more specific technical features or technical solutions, or beneficial effects in a specific embodiment. In other embodiments, additional technical features and beneficial effects may be identified in a specific embodiment that does not reflect all embodiments.

DETAILED DESCRIPTION OF THE EMBODIMENTS

Figure 1:
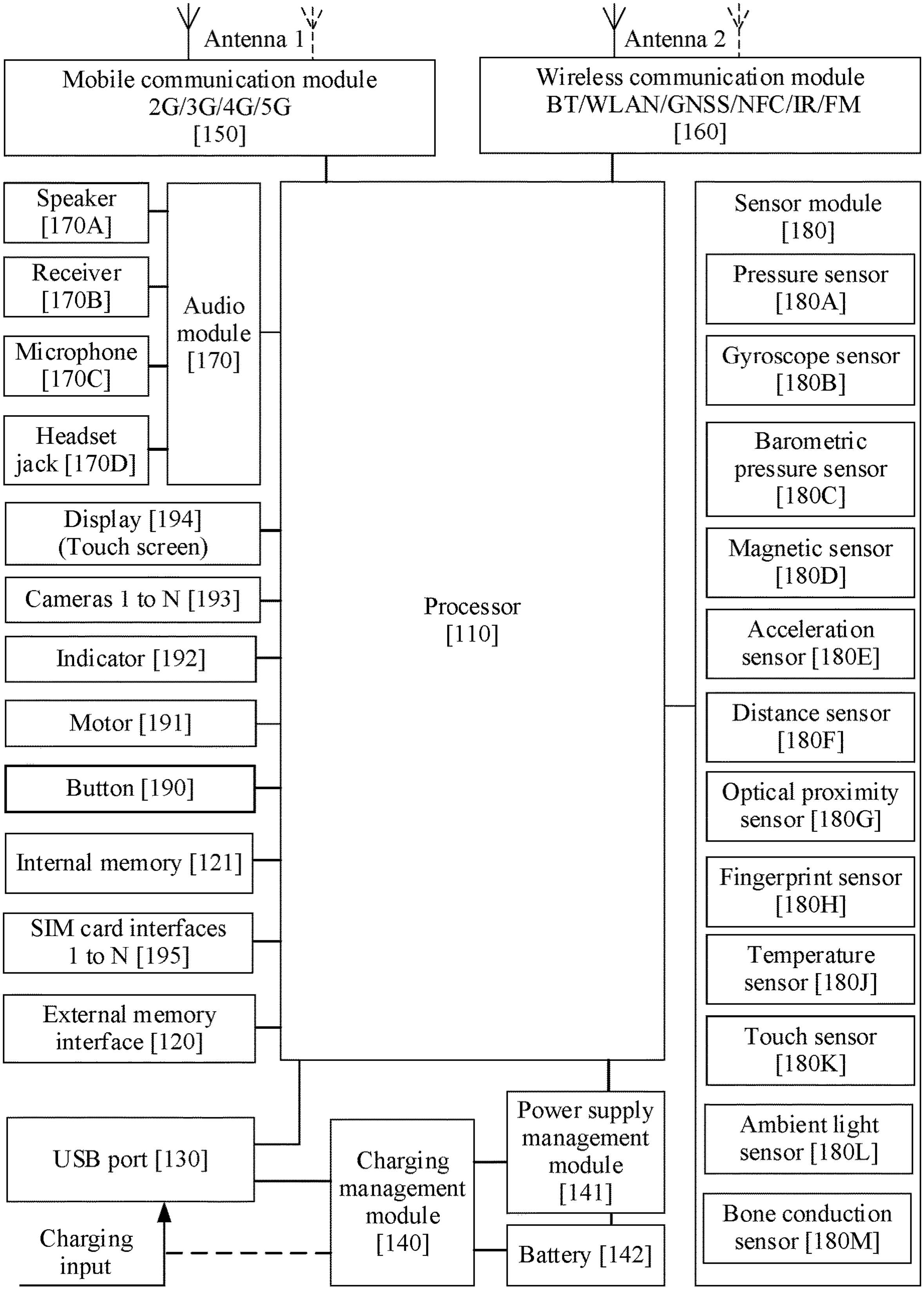
FIG. 1 is a schematic diagram of a structure of a terminal device according to an embodiment of this application.

Terms used in the following embodiments are merely intended to describe particular embodiments, but are not intended to limit this application. The terms "one", "a", "the" and "this" of singular forms used in this specification and the appended claims of this application are also intended to include expressions such as "one or more", unless otherwise specified in the context clearly. It should be further understood that in the following embodiments of this application, "at least one" and "one or more" mean one, two, or more. The character "/" usually indicates an "or" relationship between associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner. The term "connection" includes a direct connection and an indirect connection, unless otherwise indicated.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

In embodiments of this application, the term "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the term "example", "for example", or the like is intended to present a relative concept in a specific manner.

Near-field file transfer means a process of file transfer between two terminal devices in near-field communication. For example, a device 1 may discover a device 2 through Bluetooth, negotiate a related peer-to-peer (P2P) parameter with the device 2 on a Bluetooth channel, and establish a high-speed P2P channel (also referred to as a link) with the device 2. Then the device 1 may transfer a file to the device 2 through the P2P channel.

Currently, near-field file transfer between terminal devices does not support resumable transfer. The resumable transfer means that when a file is transferred between terminal devices, if the file transfer is interrupted (a connection between the terminal devices may or may not be disconnected), the terminal devices may continue to transfer the file from a point (that is, a breakpoint) at which the file transfer is interrupted. Factors that may cause the file transfer interruption include but are not limited to the following: A user actively triggers the file transfer suspension, or the file transfer interruption caused by a network fault or a terminal device fault.

For example, the device 1 transfers a file A to the device 2. When a connection between the device 1 and the device 2 fails, the transfer of the file A is also interrupted. In this case, if a user taps again to trigger the device 1 to transfer the file A to the device 2, the device 1 needs to retransfer the entire file A to the device 2, and cannot continue to transfer a remaining part of the file A to the device 2 from a point (that is, a breakpoint) at which the transfer of the file A is interrupted.

In this background, an embodiment of this application provides a file transfer method, and may be applicable to a scenario in which a transmitter transfers a file to a receiver. In the method, when the transmitter transfers the file to the receiver, resumable transfer may be supported.

The transmitter and the receiver may each be a terminal device, for example, a mobile phone, a large screen (like a smart screen), a tablet computer, a wearable device (like a smartwatch or a smart band device), a television, a vehicle-mounted device, or an augmented reality (AR)/virtual reality (VR) device, a notebook computer, an ultra-mobile personal computer (UMPC), a netbook, a personal digital assistant (PDA), and the like.

For example, that the transmitter is a mobile phone is used as an example. FIG. 1 is a schematic diagram of a structure of a terminal device according to an embodiment of this application. As shown in FIG. 1, the mobile phone may include a processor no, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

The processor no may include one or more processing units. For example, the processor no may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile phone. The controller may generate an operation control signal based on instruction operation code and a time sequence signal, to complete control of instruction reading and instruction execution.

A memory may be further disposed in the processor no, and is configured to store instructions and data. In some embodiments, the memory in the processor no is a cache memory. The memory may store instructions or data that have been used or cyclically used by the processor no. If the processor no needs to use the instructions or the data again, the processor may directly invoke the instructions or the data from the memory. This avoids repeated access, reduces waiting time of the processor no, and improves system efficiency.

In some embodiments, the processor no may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The external memory interface 120 may be used to connect to an external memory card, for example, a micro SD card, to extend a storage capability of the mobile phone. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the mobile phone and data processing. For example, when the mobile phone performs file transfer with another device (the another device may also be a mobile phone), the processor no of the mobile phone may invoke computer-executable program code stored in the internal memory 121, to implement the file transfer method provided in embodiments of this application.

The internal memory 121 may include a program storage area and a data storage area. The program storage area may store an operating system, an application (for example, the first application in this embodiment of this application) required by at least one function, and the like. The data storage area may store data (such as image data and an address book) and the like that are created during use of the mobile phone. In addition, the internal memory 121 may include a high-speed random access memory, and may further include a non-volatile memory, for example, at least one magnetic disk storage device, a flash memory, or a universal flash storage (UFS).

The charging management module 140 is configured to receive a charging input from a charger. The charging management module 140 may further supply power to the mobile phone by using the power management module 141 while charging the battery 142. The power management module 141 is configured to connect the battery 142, the charging management module 140, and the processor no. The power management module 141 may also receive an input of the battery 142 to supply power to the mobile phone.

A wireless communication function of the mobile phone may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the mobile phone may be configured to cover one or more communication frequency bands Different antennas may be further multiplexed, to improve antenna utilization. For example, the antenna 1 may be multiplexed as a diversity antenna in a wireless local area network. In some other embodiments, the antenna may be used in combination with a tuning switch. The mobile phone can transfer a file to another device by using a wireless communication function.

The mobile phone may implement an audio function, for example, music playing and recording, through the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. For example, in an embodiment of this application, the display 194 may be configured to display a display interface, a sharing interface, a file transfer interface, and the like of a gallery.

The mobile phone implements a display function by using the GPU, the display 194, the application processor, and the like. The GPU is a microprocessor for image processing, and is connected to the display 194 and the application processor. The GPU is configured to: perform mathematical and geometric computation, and render an image. The processor no may include one or more GPUs, to execute program instructions to generate or change display information.

It may be understood that the structure shown in FIG. 1 does not constitute a specific limitation on the mobile phone. In some embodiments, the mobile phone may alternatively include more or fewer components than those shown in FIG. 1, or some components may be combined, or some components may be split, or different component arrangements may be used. Alternatively, some components shown in FIG. 1 may be implemented by using hardware, software, or a combination of software and hardware.

In addition, when the terminal device is a mobile terminal like another tablet computer, a wearable device, a vehicle-mounted device, an AR/VR device, a notebook computer, a UMPC, a netbook, or a PDA, for a specific structure of the another terminal device, refer to FIG. 1. For example, components may be added to or deleted from the another terminal device based on the structure shown in FIG. 1. Details are not described herein again.

Optionally, in an embodiment of this application, the transmitter and the receiver may be a same terminal device, or may be different terminal devices. Specific device forms of the transmitter and the receiver are not limited in embodiments of this application.

The file transfer method provided in embodiments of this application may mainly include the following four pails.

In a first part, the transmitter discovers at least one receiver through scanning.

In a second part, the transmitter establishes a control channel and a data channel with the target receiver in response to the first operation.

The first operation may be an operation of a user selecting a file on the transmitter to share with the target receiver.

The control channel may be used by the transmitter to negotiate various parameters required for file transfer with the target receiver, and the data channel may be used for file transfer between the transmitter and the target receiver.

In a possible implementation, both the control channel and the data channel are logical channels. In other words, definitions of the control channel and the data channel are divided based on different functions implemented by the control channel and the data channel. Specific implementation of the control channel and the data channel is not limited in this application. For example, the control channel and the data channel may be a same channel, or may be different channels.

In some embodiments, the target receiver may be one or more of the at least one receiver discovered by the transmitter through scanning in the first part.

In some other embodiments, the target receiver selected by the user on the transmitter may not be the receiver discovered by the transmitter through scanning in the first part. For example, when a communication connection has been established between a specific receiver and the transmitter, or a specific receiver and the transmitter log in to a same user account, for the transmitter, the receiver may serve as a trusted device. The user may directly select the receiver as the target receiver at the transmitter.

In still some embodiments, when there are a plurality of target receivers, some target receivers may be receivers discovered by the transmitter through scanning in the first part, and other target receivers may be receivers that have been used as trusted devices.

In a third part, the transmitter performs parameter negotiation with the target receiver based on the control channel.

In a fourth part, the transmitter copies a file selected by the user after performing the first operation to a first buffer (where the first buffer may be referred to as a sending buffer or a transmission buffer), and transfers the file in the first buffer to the target receiver based on the data channel. For example, a file selected by the user after performing the first operation may be copied from a read only memory (ROM) to the first buffer. In a process of file transfer from the transmitter to the target receiver, when the file transfer is interrupted and starts to resume, the transmitter identifies whether a file whose transfer is not completed is changed. When the file whose transfer is not completed is not changed, the transmitter resumes the transfer from a breakpoint at which the file transfer is interrupted. The file whose transfer is not completed may also be referred to as a file that needs to continue to be transferred.

The files whose transfer is not completed means all files that are in files selected by the user and that have not been transferred to the target receiver. For example, when the files selected by the user include only one file, and the file transfer is interrupted, the file whose transfer is not completed is the file. For another example, when the files selected by the user include only a plurality of files, and transfer of a specific file is interrupted, the file whose transfer is not completed is a file whose transfer has not started in the plurality of files and a file whose transfer is interrupted.

It should be understood that the transmitter resumes the transfer from the breakpoint at which the file transfer is interrupted means that the transmitter continues to transmit, to the target receiver, a remaining part after the breakpoint of the file at which the file is interrupted and another file whose transfer has not started.

The first part to the fourth part are described below as examples.

In the first part and the second part, for example, the transmitter is a mobile phone 1, and the receiver includes a mobile phone 2 and a mobile phone 3. The mobile phone 1, the mobile phone 2, and the mobile phone 3 may each include a distributed switch. The distributed switch may also be referred to as a scanning switch, a device connection switch, or the like. This is not limited herein. When a user turns on the distributed switches of the mobile phone 1, the mobile phone 2, and the mobile phone 3, the mobile phone 1 may scan the mobile phone 2 and the mobile phone 3. Similarly, the mobile phone 2 may scan the mobile phone 1 and the mobile phone 3, and the mobile phone 3 may scan the mobile phone 1 and the mobile phone 2. The mobile phone 1 may include a plurality of pictures. The user may select at least one picture from a gallery of the mobile phone 1 to share. When the user selects at least one picture on the mobile phone 1 for sharing, the mobile phone 1 may display a sharing interface. The sharing interface may include identification information of the mobile phone 2 and identification information of the mobile phone 3. The user may tap the identification information of the mobile phone 2 on the sharing interface, and the mobile phone 1 may establish a control channel and a data channel with the mobile phone 2 in response to an operation of tapping the identification information of the mobile phone 2 by the user. The mobile phone 2 is the target receiver, and an operation of the user selecting a picture on the mobile phone 1 for sharing, and an operation of the user tapping the identification information of the mobile phone 2 are the foregoing first operations. The picture selected by the user on the mobile phone 1 is a file that is selected by the user and that needs to be transferred from the mobile phone 1 to the mobile phone 2.

Figure 2:
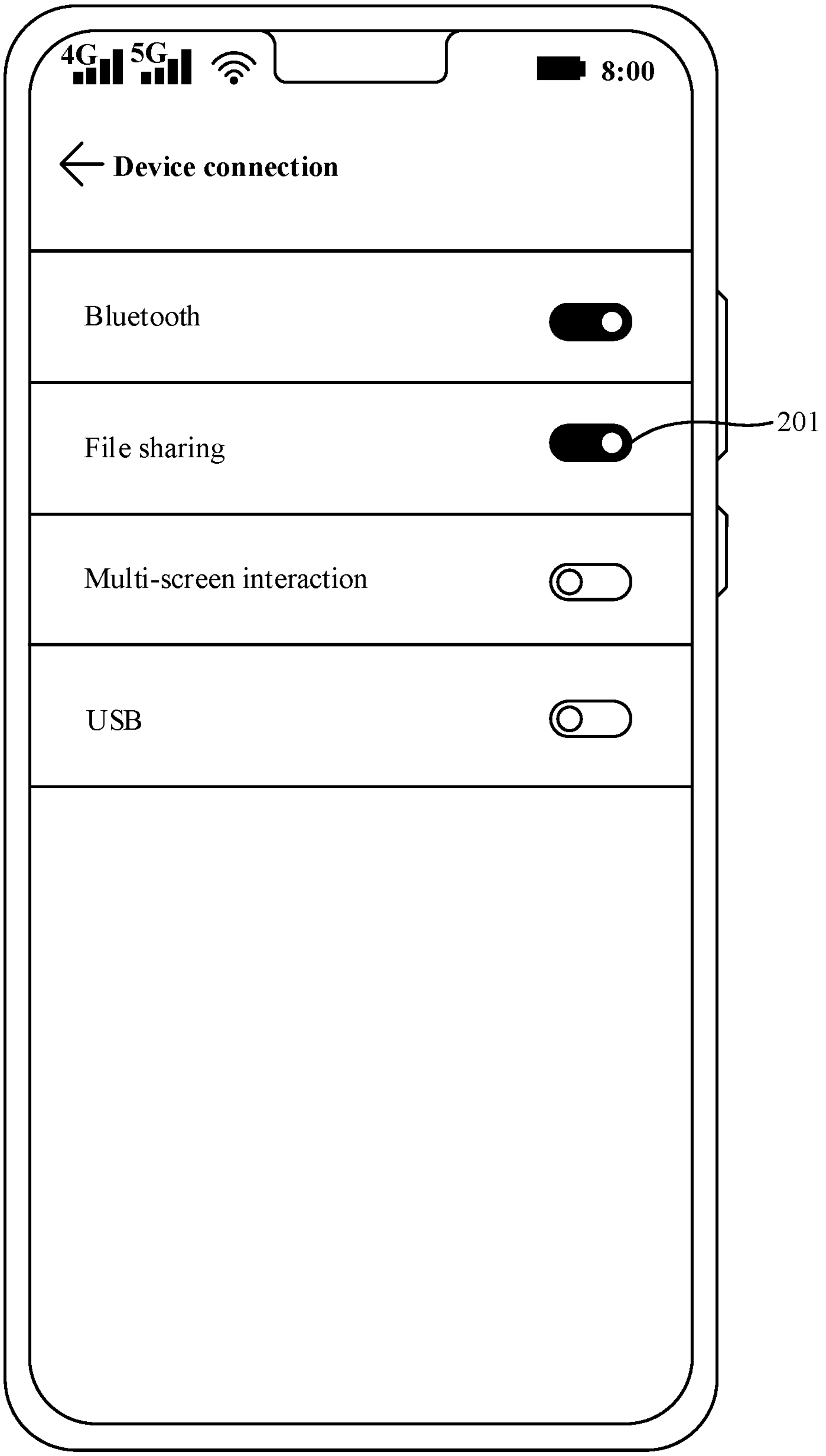
FIG. 2 is a schematic diagram of a device connection setting interface of a mobile phone according to an embodiment of this application.

For example, a near-field file transfer function of the mobile phone is file sharing. FIG. 2 is a schematic diagram of a device connection setting interface of a mobile phone according to an embodiment of this application. As shown in FIG. 2, the device connection setting interface of the mobile phone may include options such as Bluetooth, file sharing, multi-screen interaction, and USB. Each option may include an on/off button corresponding to the option, for example, an on/off button 201 corresponding to file sharing. The user may tap the on/off button 201 corresponding to file sharing on the device connection setting interface shown in FIG. 1, to trigger the mobile phone to enable or disable the file sharing function. A state of the file sharing function shown in FIG. 2 is enabled. The on/off button 201 corresponding to file sharing is the foregoing distributed switch. When the distributed switch of the mobile phone is turned on, the mobile phone may scan another device or be scanned by another device.

Figure 3:
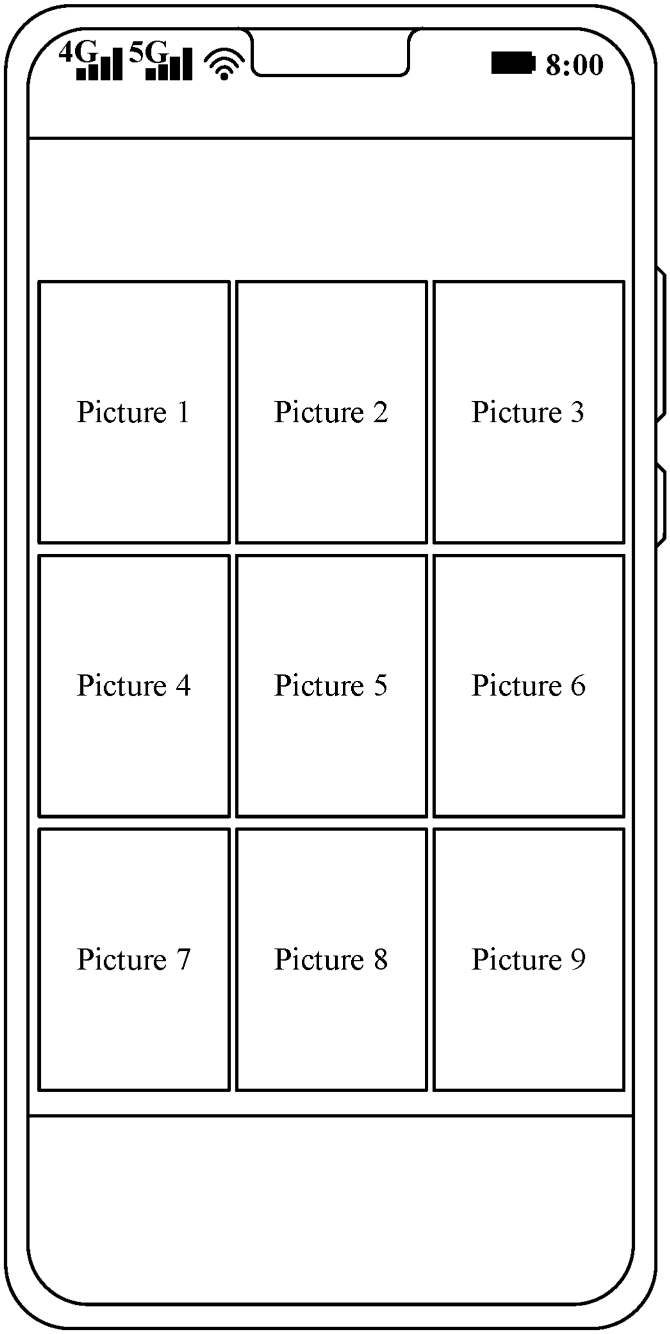
FIG. 3 is a schematic diagram of a display interface of a gallery according to an embodiment of this application.
Figure 4:
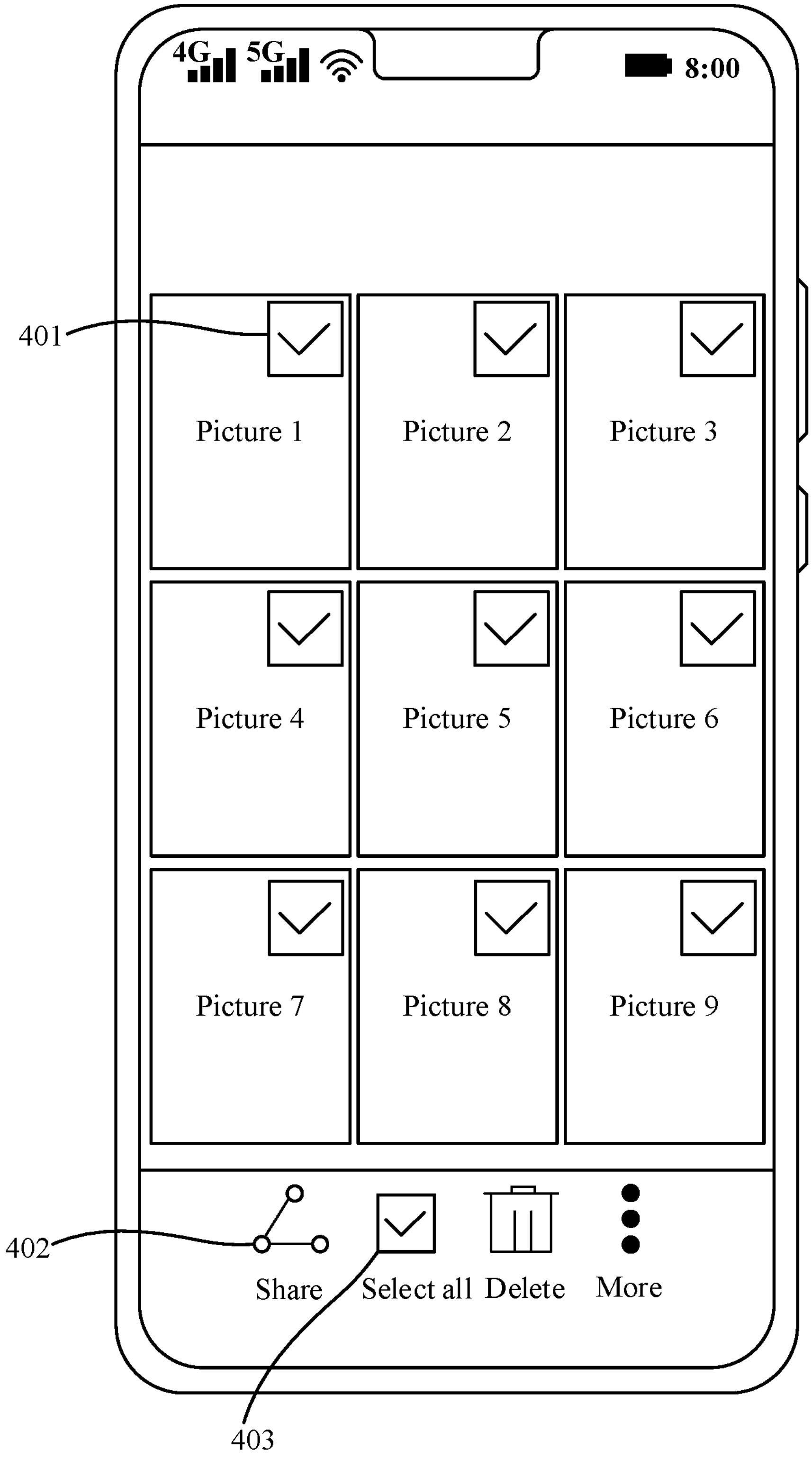
FIG. 4 is another schematic diagram of a display interface of a gallery according to an embodiment of this application.

FIG. 3 is a schematic diagram of a display interface of a gallery according to an embodiment of this application. When the user views a picture in the gallery of the mobile phone 1, the mobile phone 1 may display a display interface of a gallery shown in FIG. 3. As shown in FIG. 3, the display interface of the gallery may include a plurality of pictures, for example, a picture 1 to a picture 9. The user can touch and hold any image on the display interface of the gallery to trigger an image selection function. For example, FIG. 4 is another schematic diagram of a display interface of a gallery according to an embodiment of this application. As shown in FIG. 4, the mobile phone 1 may display a select button 401 on each picture in response to an operation of touching and holding any picture by the user (only the select button corresponding to FIG. 1 is marked as an example in FIG. 4), and a share button 402 and a select all button 403 are displayed in the bottom of the display interface of the gallery, and other function buttons such as a delete button and a more button may be further displayed. The user may tap the select button 401 on the display interface of the gallery shown in FIG. 4, select one or more pictures, and tap the share button 402 below, to trigger the mobile phone to display a sharing interface corresponding to the picture selected by the user. Alternatively, the user may also tap the select all button 403 on the display interface of the gallery shown in FIG. 4 to select all pictures, and tap the share button 402 below, to trigger the mobile phone to display a sharing interface corresponding to the pictures selected by the user.

Figure 5:
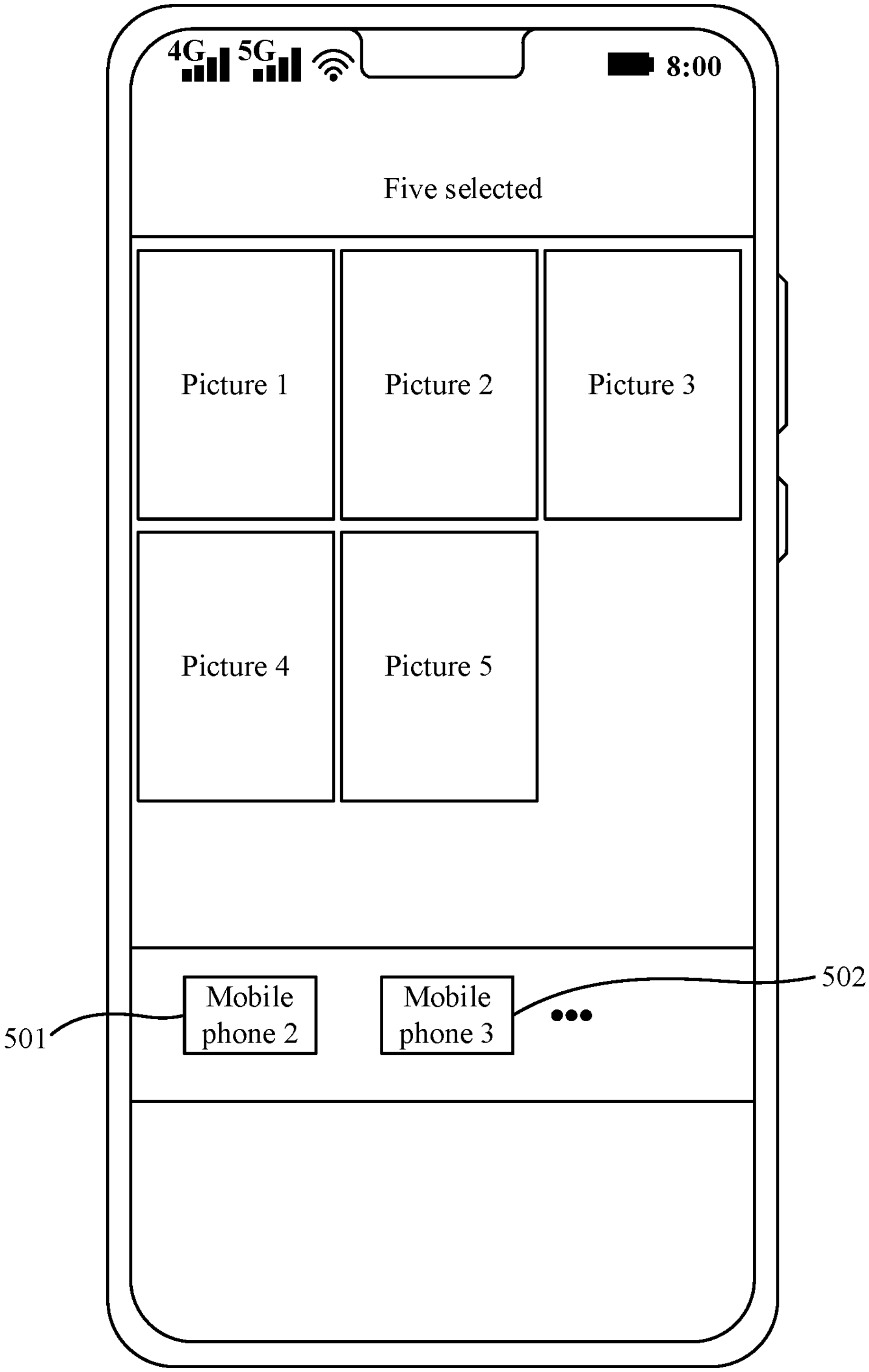
FIG. 5 is a schematic diagram of a sharing interface according to an embodiment of this application.

For example, FIG. 5 is a schematic diagram of a sharing interface according to an embodiment of this application. It is assumed that the user successively taps, on the display interface of the gallery shown in FIG. 4, the select button 401 corresponding to each of a picture 1 to a picture 5, and taps the share button 402. In this case, the mobile phone may display a sharing interface shown in FIG. 5 in response to the foregoing operation of the user. As shown in FIG. 5, in this case, the sharing interface may include at least identification information 501 of the mobile phone 2 and identification information 502 of the mobile phone 3. For example, the identification information 501 of the mobile phone 2 may be a device name or a device model of the mobile phone 2, and the identification information 502 of the mobile phone 3 may be a device name or a device model of the mobile phone 3. When the user wants to share the selected picture 1 to the picture 5 with the mobile phone 2, the user may tap the identification information 501 of the mobile phone 2 on the sharing interface shown in FIG. 5. The mobile phone 1 may establish a control channel and a data channel with the mobile phone 2 in response to an operation of tapping the identification information 501 of the mobile phone 2 by the user. Then, the picture 1 to the picture 5 may be transferred between the mobile phone 1 and the mobile phone 2 based on the processes described in the third part and the fourth part.

It should be understood that, as shown in FIG. 3 to FIG. 5, that the transferred file includes the picture 1 to the picture 5 is merely used as an example. In some other examples, the transferred file may also include more or fewer pictures. Alternatively, the transferred file may be another type of file, for example, a video file or a music file. A specific file type of the transferred file is not limited in this application.

In addition, there may be one or more pieces of identification information of the receiver included on the sharing interface displayed by the mobile phone 1. For example, when there is only one mobile phone 2 with a distributed switch turned on near the mobile phone 1, the sharing interface may include only identification information of the mobile phone 2. For another example, when there is a mobile phone 2, a mobile phone 3, and a watch 1 whose distributed switches are turned on near the mobile phone 1, the sharing interface may include identification information of the mobile phone 2, identification information of the mobile phone 3, and identification information of the watch 1. In other words, the transmitter may display, on the sharing interface, identification information of all scanned receivers, for the user to select. Optionally, the user may select one or more receivers as the target receivers. In this embodiment, only one target receiver is used as an example for description. When the user selects a plurality of target receivers, the transmitter and each target receiver separately perform file transfer according to the file transfer method provided in embodiments of this application.

In some embodiments, after scanning the target receiver, the transmitter has obtained an address of the target receiver. The transmitter may quickly establish, to the target receiver as a control channel, a Bluetooth low energy (BLE) connection, a Bluetooth basic rate (BR) connection, a Bluetooth enhanced data rate (EDR) connection, a P2P connection, or the like. Alternatively, if the transmitter and the target receiver are already connected to a Wi-Fi network, the transmitter may also quickly establish an IP connection to the target receiver as a control channel. Alternatively, the transmitter may alternatively use BLE broadcast as a control channel established with the target receiver. Specific implementation of the control channel is not limited herein.

Optionally, that the transmitter establishes a data channel with the target receiver may mean that the transmitter establishes a high-speed P2P channel with the target receiver.

In some embodiments, the control channel and the data channel may be a same channel.

In the third part, that the transmitter performs parameter negotiation with the target receiver based on the control channel may include: The transmitter sends basic information of the file selected by the user to the target receiver based on the control channel, for example, a file list, a file name, and a file size. The target receiver returns an acknowledgment message for the basic information of the file selected by the user to the transmitter based on the control channel.

After completing parameter negotiation with the target receiver based on the control channel, the transmitter may perform an operation in the fourth part.

In the fourth part, in a process in which the transmitter transmits, based on the data channel, the file (that is, the file in the first buffer) selected by the user to the target receiver, file transfer may be interrupted, for example, in two cases. In one case, the file transfer is interrupted, but the transmitter may not be disconnected from the target receiver. For example, when the user actively performs a suspend operation to trigger the transmitter and the target receiver to suspend file transfer, the file transfer is interrupted, but the transmitter is not disconnected from the target receiver. In the other case, the file transfer is interrupted, and the transmitter is disconnected from the target receiver. For example, when a network fault occurs at the transmitter and/or the target receiver or a device fault occurs at the transmitter and/or the target receiver, the file transfer may be interrupted, and the transmitter may be disconnected from the target receiver. That the transmitter is disconnected from the target receiver may include a disconnection of the control channel and the data channel between the transmitter and the target receiver.

If the file transfer is interrupted, but the transmitter is not disconnected from the target receiver, when the transfer is resumed between the transmitter and the target receiver (for example, when the user actively continues the transfer, the transmitter and the target receiver are triggered to continue the file transfer), the transmitter can identify whether a file whose transfer is not completed is changed. When the file whose transfer is not completed is not changed, the transmitter resumes the transfer from a breakpoint at which the file transfer is interrupted.

When the file transfer is interrupted, the transmitter is disconnected from the target receiver, and the transfer is resumed between the transmitter and the target receiver (for example, when the network fault of the transmitter and/or the target receiver is recovered or the device fault of the transmitter and/or the target receiver is recovered, the transfer can be automatically resumed), the transmitter needs to re-establish a control channel and a data channel with the target receiver. Then, that the transmitter performs, based on the re-established control channel, parameter negotiation with the target receiver may specifically include: The transmitter sends, to the target receiver, breakpoint information based on the control channel, for example, a breakpoint at which the file transfer is interrupted; and the target receiver returns an acknowledgment message of the breakpoint information to the transmitter based on the control channel. After that, the transmitter may identify whether the file whose transfer is not completed is changed. When the file whose transfer is not completed is not changed, the transmitter resumes the transfer from a breakpoint at which the file transfer is interrupted.

Optionally, in an embodiment of this application, that the transmitter identifies whether a file whose transfer is not completed is changed includes the following cases.

(1) The transmitter identifies whether each of the files whose transfer is not completed is changed.

(2) The transmitter identifies whether a file in the files whose transfer is not completed is deleted.

(3) The transmitter identifies whether a new file is added to the files whose transfer is not completed.

That the files whose transfer is not completed are not changed means that each file whose transfer is not completed is not changed, and there is no file deleted from or added to the files whose transfer is not completed.

That the files whose transfer is not completed are changed may include any one or more of the following cases: one or more of the files whose transfer is not completed are changed; there are one or more files deleted from the files whose transfer is not completed; or there are one or more files added to the files whose transfer is not completed.

The one or more files that are changed or deleted from the files whose transfer is not completed may include a file whose transfer has not started, and/or a file whose transfer is interrupted.

For example, the transmitter identifies whether a file 1 (the file 1 can be a file whose transfer has not started or a file whose transfer is interrupted) in the files whose transfer is not completed is changed, and a specific manner in which the transmitter identifies whether the file 1 is changed is as follows.

In some embodiments, the transmitter may obtain a file time (for example, the file time may be a latest modified time) of the file 1 before starting to transfer the file to the target receiver. The file time format may be "*year*month*day*hour*minute*second". The asterisk * indicates a specific time. When the transfer is resumed between the transmitter and the target receiver, the transmitter may obtain a file time of the file 1 again. The transmitter may compare whether the file time of the file 1 when the transfer is resumed is different from the file time of the file 1 before starting to transfer the file to the target receiver. If the file time of the file 1 when the transfer is resumed is consistent with the file time of the file 1 before starting to transfer the file to the target receiver, for example, if the file time of the file 1 when the transfer is resumed is the same as the file time of the file 1 before starting to transfer the file to the target receiver, it indicates that file 1 is not changed after the file transfer is interrupted. If the file time of the file 1 when the transfer is resumed is inconsistent with the file time of the file 1 before starting to transfer the file to the target receiver, for example, if the file time of the file 1 when the transfer is resumed is later than the file time of the file 1 before starting to transfer the file to the target receiver, it indicates that file 1 is changed after the file transfer is interrupted.

In some other embodiments, the transmitter may also obtain a hash value of the file 1 according to a first hash algorithm before starting to transfer the file to the target receiver. When the transfer is resumed between the transmitter and the target receiver, the transmitter may obtain, according to the first hash algorithm again, the hash value of the file 1 after the file transfer is interrupted. The transmitter may compare whether a hash value of the file 1 before the file transfer is interrupted is equal to the hash value after the file transfer is interrupted. If the hash values are equal to each other, it indicates that the file 1 is not changed; or if the hash values are not equal, it indicates that the file 1 is changed after the file transfer is interrupted.

For example, the first hash algorithm may be a crc32 algorithm, an md5 algorithm, a shat algorithm, a sha256 algorithm, a sha512 algorithm, a sha3 algorithm, a ripdemd160 algorithm, or the like. A type of the first hash algorithm is not limited in this application. In addition, a manner in which the transmitter identifies whether each of the files whose transfer is not completed is changed is not limited in embodiments of this application.

In some embodiments, even if a file whose transfer is not completed is changed, resumable transfer is allowed under a preset condition or when the user instructs to allow the transfer. For example, when it is determined that a file whose transfer is not completed is changed, an acknowledgment request is presented to the user. The request may be used to present information such as a quantity, a proportion, or content of changed files, so that the user decides whether to allow resumable transfer, and resumes the transfer when the user instructs to allow the transfer.

In the fourth part, for a case in which the file transfer is interrupted but the transmitter is not disconnected from the target receiver, and a case in which the file transfer is interrupted and the transmitter is disconnected from the target receiver, when the transfer is resumed between the transmitter and the target receiver, and the transmitter identifies that the file whose transfer is not completed is changed, if the file whose transfer is interrupted is not deleted or changed, the transmitter may continue to transfer the file whose transfer is interrupted from a breakpoint of the file whose transfer is interrupted. If the file whose transfer is interrupted is deleted, the transmitter may skip the file whose transfer is interrupted and start to transfer other subsequent files. If the file whose transfer is interrupted is not deleted but is changed, the transmitter may read a modified (that is, changed) file again, and retransfer the entire modified file. The file whose transfer is interrupted may be referred to as a first file.

However, for a file other than a file whose transfer is interrupted in the files whose transfer is not completed, when the file is changed, the transmitter may update a changed file to the first buffer, and when the file is subsequently transferred, the transmitter transfers the modified file to the target receiver. When the file is deleted, the transmitter may correspondingly delete the file buffered in the first buffer, and subsequently skip transferring the file to the target receiver. When the file is an added file, the transmitter may also copy the new file to the first buffer, and subsequently transfer the added file to the receiver. The file other than the file whose transfer is interrupted in the files whose transfer is not completed may be a second file.

An example is used.

For example, the user shares the picture 1 to the picture 5 to the mobile phone 2 by using the mobile phone 1, and the mobile phone 1 may sequentially transfer the picture 1 to the picture 5 to the mobile phone 2. Assuming that an interruption occurs when the picture 2 is transferred, and 55% of the picture 2 is transferred. In this case, the picture 1 is a file whose transfer has been completed, and the picture 2 to the picture 5 are files whose transfer is not completed. When the transfer is resumed between the mobile phone 1 and the mobile phone 2, the mobile phone 1 may identify, in the manner described in the foregoing embodiment, whether the picture 2 to the picture 5 are changed.

It is assumed that the picture 2 to the picture 5 are not changed, the mobile phone 1 may resume the transfer from a breakpoint of the picture 2 (a position of 55% of the picture 2).

Assuming that the picture 2 is not deleted or changed. If one of the picture 3 to the picture 5 is changed, the mobile phone 1 may resume the transfer from the breakpoint of the picture 2, and update the changed picture in the picture 3 to the picture 5 to the first buffer (for example, when the picture 3 is changed, a modified picture 3 may be used to replace the picture 3 in the first buffer). When the changed picture is subsequently transferred, the mobile phone 1 may transfer the changed picture to the mobile phone 2. If one of the picture 3 to the picture 5 is deleted, the mobile phone 1 may resume the transfer from the breakpoint of the picture 2, correspondingly delete the deleted picture buffered in the first buffer, and subsequently skip transferring the picture to the mobile phone 2. If the user selects, on the mobile phone, a picture 6 to be shared with the mobile phone 2, the mobile phone may also copy the picture 6 to the first buffer, and subsequently transfer the picture 6 to the receiver.

Assuming that the picture 2 is deleted, the mobile phone 1 may skip the picture 2, and continue to transfer subsequent picture 3 to picture 5. For transfer of the picture 3 to the picture 5, refer to the foregoing descriptions in a scenario in which the picture 2 is not deleted or changed.

Assuming that the picture 2 is not deleted but is changed, the mobile phone 1 may read the modified picture 2 again, and re-transfer the modified picture 2 (no transfer is resumed from the previous breakpoint). Then, the mobile phone 1 may continue to transfer subsequent picture 3 to picture 5. For transfer of the picture 3 to the picture 5, also refer to the foregoing descriptions in a scenario in which the picture 2 is not deleted or changed.

In some embodiments, for a scenario in which the transfer is resumed between the transmitter and the target receiver, and the transmitter identifies that a file whose transfer is not completed is changed, when the transmitter identifies there are one or more files (can include a file whose transfer has not started and/or a file whose transfer is interrupted) deleted from the files whose transfer is not completed, or when there are one or more files added to the files whose transfer is not completed, the transmitter may display a corresponding prompt message to the user on a file transfer interface, and after receiving an operation that the user acknowledges to start to resume the transfer, resume the transfer in the manner described in the foregoing embodiment. If the user exits resumable transfer on the file transfer interface, the transmitter may exit a resumable transfer procedure and skip transferring the file to the target receiver. The prompt message displayed on the file transfer interface of the transmitter to the user may be referred to as first information, and the first information includes change information about a change of a file that needs to continue to be transferred.

Figure 6:
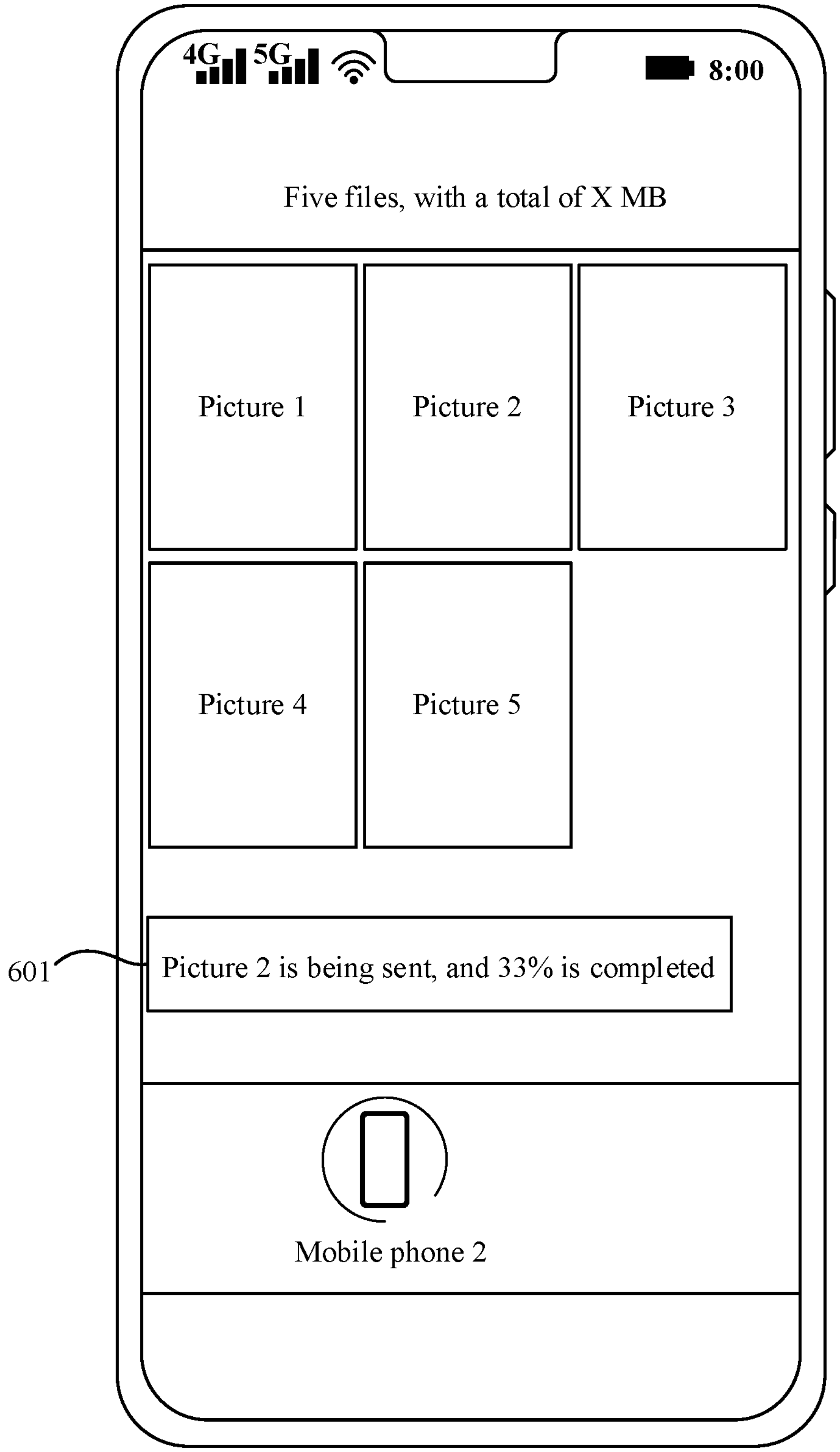
FIG. 6 is a schematic diagram of a file transfer interface according to an embodiment of this application.

For example, FIG. 6 is a schematic diagram of a file transfer interface according to an embodiment of this application. For example, in the scenario shown in FIG. 5, the user selects and transfers the picture 1 to the picture 5 on the mobile phone 1 to the mobile phone 2. In a process in which the mobile phone 1 transfers the picture 1 to the picture 5 to the mobile phone 2, the mobile phone 1 may display a file transfer interface corresponding to the picture 1 to the picture 5 shown in FIG. 6. As shown in FIG. 6, the file transfer interface may include at least a transfer progress 601, for example, the transfer progress 601 may be "Picture 2 is being sent, and 33% is completed".

Figure 7:
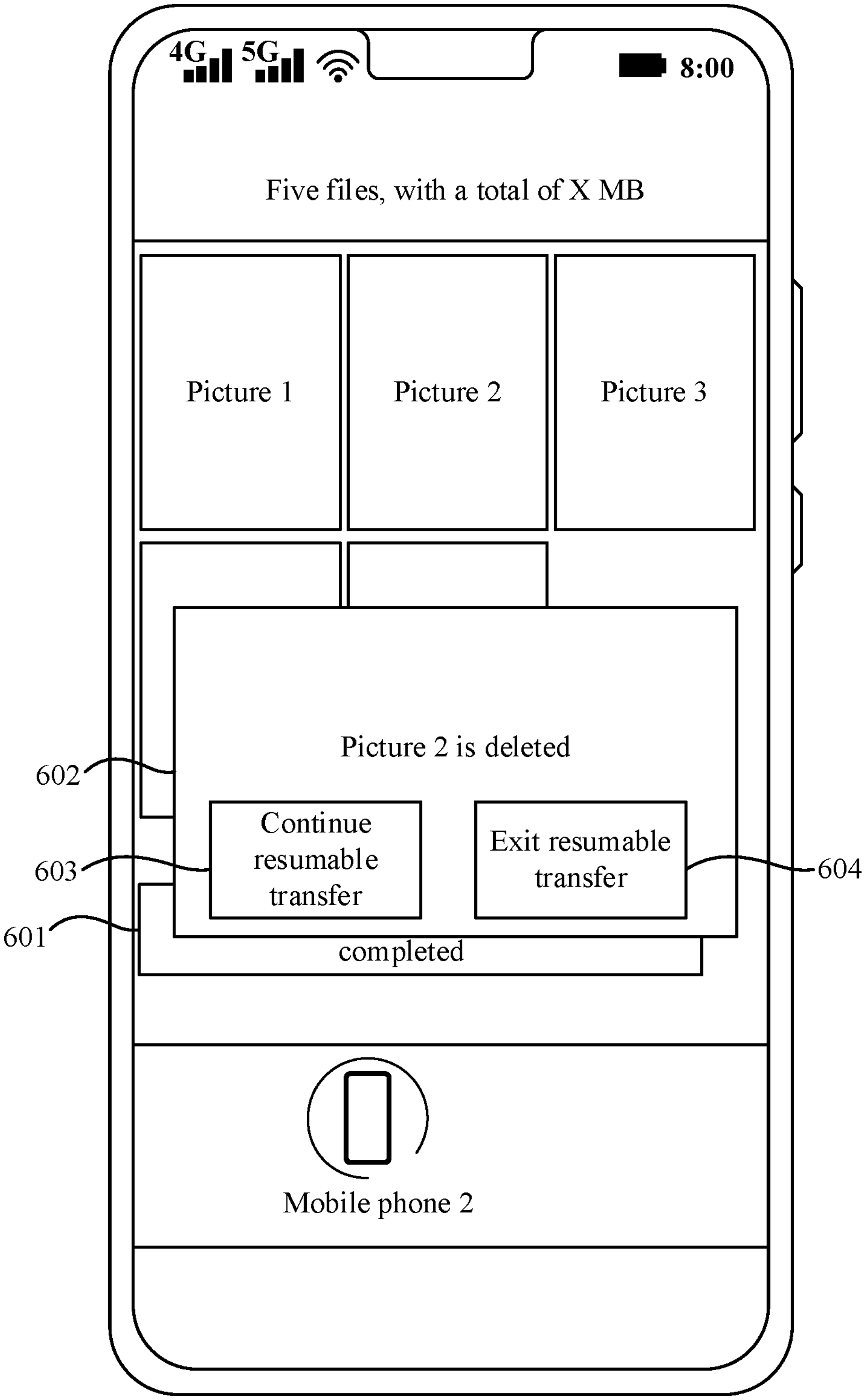
FIG. 7 is another schematic diagram of a file transfer interface according to an embodiment of this application.

For example, FIG. 7 is another schematic diagram of a file transfer interface according to an embodiment of this application. As shown in FIG. 7, when the transfer is resumed between the mobile phone 1 and the mobile phone 2, if the mobile phone 1 recognizes that the picture 2 is deleted, the mobile phone 1 may display a prompt box 602 on the file transfer interface, where a prompt message indicating that the picture 2 is deleted: "Picture 2 is deleted" may be displayed in the prompt box 602. The prompt box 602 may further include a resumable transfer button 603 and a resumable transfer exit button 604. When the user taps the resumable transfer button 603, the mobile phone 1 may start resumable transfer in the manner described in the foregoing embodiment in response to an operation of the user tapping the resumable transfer button 603. When the user taps the resumable transfer exit button 604, the mobile phone 1 may exit the resumable transfer procedure in response to an operation of the user tapping the resumable transfer exit button 604, and skip transferring the picture 2 to the picture 5 to the mobile phone 2.

Figure 8:
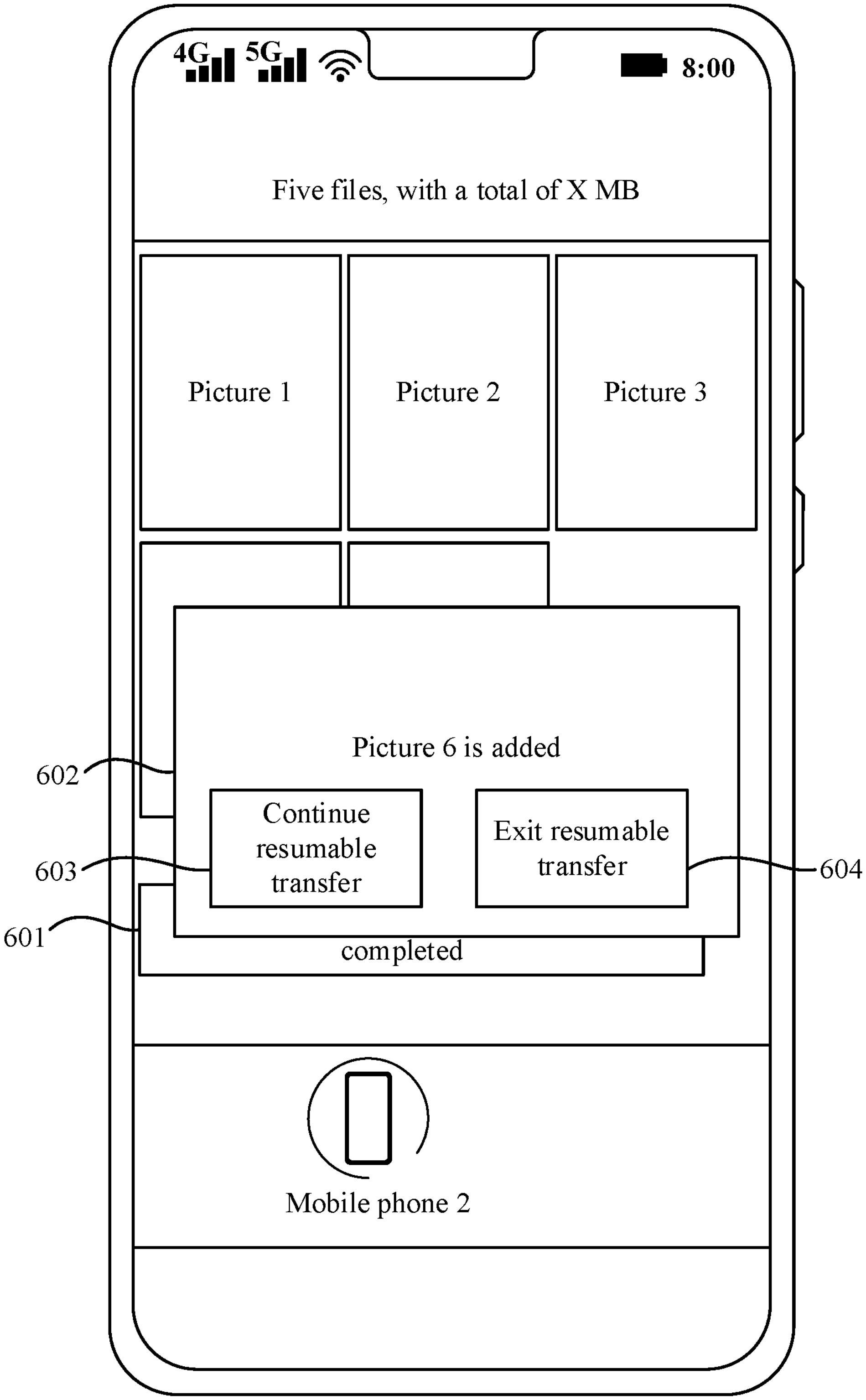
FIG. 8 is still another schematic diagram of a file transfer interface according to an embodiment of this application.

For example, FIG. 8 is still another schematic diagram of a file transfer interface according to an embodiment of this application. As shown in FIG. 8, when the transfer is resumed between the mobile phone 1 and the mobile phone 2, if the mobile phone 1 recognizes that the user selects a picture 6 on the mobile phone 1 to share with the mobile phone 2, the mobile phone 1 may display, in a prompt box 602 displayed on the file transfer interface, a prompt message indicating that the picture 6 is added: "Picture 6 is added". Similar to the type described in FIG. 6, the user may tap the resumable transfer button 603, to trigger the mobile phone 1 to start to resume the transfer in the manner described in the foregoing embodiment. Alternatively, the user may tap the resumable transfer exit button 604 to trigger the mobile phone 1 to exit the resumable transfer procedure.

It should be understood that, when the mobile phone 1 identifies that the picture 2 is deleted, and the user selects the picture 6 on the mobile phone 1 to share with the mobile phone 2, the prompt box 602 may include both a prompt message indicating that the picture 2 is deleted and a prompt message indicating that the picture 6 is added. Details are not described herein again. In addition, the foregoing prompt messages such as "Picture 2 is deleted" and "Picture 6 is added" are all examples for description. In another embodiment, the prompt messages may also be other content, for example, "Picture 2 is deleted" may also be replaced with "Picture 2 has been deleted". This is not limited herein.

Optionally, in an embodiment of this application, to distinguish between "the transmitter performs parameter negotiation with the target receiver based on the control channel" in the third part and "for a case in which file transfer is interrupted and the transmitter is disconnected from the target receiver, the transmitter performs parameter negotiation with the target receiver based on the re-established control channel" in the fourth part, when the transmitter performs parameter negotiation with the target receiver based on the control channel, the transmitter may further negotiate with the target receiver that the current connection is a new connection or a breakpoint-based connection. For example, in the third part, the transmitter may send a first indication message to the target receiver, where the first indication message indicates that the current connection is a new connection. In the fourth part, the transmitter may send a second indication message to the target receiver, where the second indication message indicates that the current connection is a breakpoint-based connection. The target receiver may return an acknowledgment message for the first indication message or the second indication message to the transmitter.

In this embodiment, when the transmitter is connected to the target receiver, if the transmitter negotiates with the target receiver that the current connection is a new connection, the transmitter may directly read and transfer a locally selected file to the target receiver. For example, the locally selected file may be a file that the user chooses to share. If the transmitter negotiates with the target receiver that the current connection is a breakpoint-based connection, the transmitter may resume the transfer according to the descriptions in the case in which file transfer is interrupted and the transmitter is disconnected from the target receiver in the fourth part.

It should be understood that, in this embodiment of this application, when the transmitter transfers the file to the target receiver based on the data channel, when normal transfer is completed without interruption, the target receiver may directly import the file whose transfer is completed for storage, that is, a scenario of resumable transfer does not exist.

Optionally, when performing the first operation by the transmitter to select a file for sharing with the target receiver, the user may select one or more files; or select a plurality of folders, where each folder may include at least one file; or select a combination of a plurality of files and a plurality of folders. This is not limited herein.

Optionally, in the fourth part, for a case in which file transfer is interrupted and the transmitter is disconnected from the target receiver, when the transfer is resumed between the transmitter and the target receiver, after the transmitter re-establishes the control channel and the data channel with the target receiver, the transmitter may further first identify whether the target receiver for current resumable transfer and the target receiver to which a connection is established when the file transfer starts last time (that is, the target receiver that establishes the connection in the second part) are a same device. If the target receiver for current resumable transfer and the target receiver that establishes the connection when the file transfer starts last time are the same device, the target receiver is not changed after the file transfer is interrupted (that is, the target receiver in the resumable transfer is trusted), and the transmitter may perform a subsequent resumable transfer procedure in the manner described in the foregoing embodiment. If the target receiver for current resumable transfer is different from the target receiver that establishes the connection when the file transfer starts last time, it indicates that the target receiver is changed after the file transfer is interrupted (that is, the target receiver for current resumable transfer is untrusted), and the transmitter may directly exit the resumable transfer procedure.

In a possible design, an implementation solution in which the transmitter identifies whether the target receiver for current resumable transfer and the target receiver that establishes the connection when the file transfer starts last time are the same device may include: The transmitter and the target receiver separately generate an independent asymmetric encryption key pair (for example, an RSA key pair) in advance, where the asymmetric encryption key pair includes a public key and a private key. The public key of the transmitter is different from the public key of the target receiver, and the private key of the transmitter is different from the private key of the target receiver. In the third part, when the transmitter performs parameter negotiation with the target receiver based on the control channel, the transmitter and the target receiver first exchange the public keys of each other. After the transmitter and the target receiver first exchange the public keys of each other, for a subsequent parameter negotiation process and a file transfer process, when data is transmitted between the transmitter and the target receiver, the transmitter and the target receiver may separately use the public key of the other side to encrypt transmitted data, and a peer side may use the private key of itself and decrypt the transmitted data, to prevent communication spoofing. In the fourth part, for a case in which file transfer is interrupted and the transmitter is disconnected from the target receiver, when the transfer is resumed between the transmitter and the target receiver, after the transmitter re-establishes the control channel and the data channel with the target receiver, the transmitter and the target receiver may exchange public keys of each other again, and the transmitter may verify whether the public key of the target receiver that is obtained during the current resumable transfer is consistent with the public key of the target receiver that establishes the connection when the file transfer starts last time. If the public keys are consistent, it indicates that the target receiver for current resumable transfer and the target receiver that establishes the connection when the file transfer starts last time are a same device. If the public keys are inconsistent, it indicates that the target receiver for current resumable transfer and the target receiver that establishes the connection when the file transfer starts last time are different devices.

In another possible design, an implementation solution in which the transmitter identifies whether the target receiver for current resumable transfer and the target receiver that establishes the connection when the file transfer starts last time are the same device may further include: The transmitter and the target receiver separately generate an independent asymmetric encryption key pair (for example, an RSA key pair) in advance, where the asymmetric encryption key pair includes a public key and a private key. The public key of the transmitter is different from the public key of the target receiver, and the private key of the transmitter is different from the private key of the target receiver. In the third part, when the transmitter performs parameter negotiation with the target receiver based on the control channel, the transmitter and the target receiver first exchange the public keys of each other. After the transmitter and the target receiver first exchange the public keys of each other, for a subsequent parameter negotiation process and a file transfer process, when data is transmitted between the transmitter and the target receiver, the transmitter and the target receiver may separately use the public key of the other side to encrypt transmitted data, and a peer side may use the private key of itself and decrypt the transmitted data, to prevent communication spoofing. In the fourth part, for a case in which file transfer is interrupted and the transmitter is disconnected from the target receiver, when the transfer is resumed between the transmitter and the target receiver, after the transmitter re-establishes the control channel and the data channel with the target receiver, the transmitter and the target receiver may also exchange hash values of public keys of each other (the hash values may be obtained by performing calculation on the public keys according to the foregoing first hash algorithm, for example, a sha256 algorithm). The transmitter may verify whether the hash value of the public key of the target receiver that is obtained during the current resumable transfer is consistent with the hash value of the public key of the target receiver that establishes the connection when the file transfer starts last time. If the hash values are consistent, it indicates that the target receiver for current resumable transfer and the target receiver that establishes the connection when the file transfer starts last time are a same device. If the hash values are inconsistent, it indicates that the target receiver for current resumable transfer and the target receiver that establishes the connection when the file transfer starts last time are different devices.

Optionally, in still some embodiments of this application, in any one of the foregoing implementation solutions in which the transmitter identifies whether the target receiver for current resumable transfer and the target receiver that establishes the connection when the file transfer starts last time are the same device, in the third part, when the transmitter performs parameter negotiation with the target receiver based on the control channel, after the transmitter and the target receiver exchange public keys of each other, the transmitter may further generate a symmetric key, and distribute (send) to the target receiver a symmetric key encrypted by using the public key of the target receiver. The target receiver may obtain the symmetric key through decryption based on the public key of the target receiver. For a subsequent parameter negotiation process and a file transfer process, when data is transmitted between the transmitter and the target receiver, the symmetric key may be used to encrypt transmitted data, and a peer side may use the symmetric key to decrypt the transmitted data, to prevent communication spoofing. This is not limited herein.

In the fourth part, for a case in which file transfer is interrupted, the transmitter is disconnected from the target receiver, and the transfer is resumed between the transmitter and the target receiver, after the transmitter re-establishes the control channel and the data channel with the target receiver, when identifying that the target receiver for current resumable transfer and the target receiver that establishes the connection when file transfer starts last time are the same device, the transmitter performs a subsequent resumable transfer procedure in the manner described in the foregoing embodiment. This prevents communication security from being affected by a new accessed device (a device that establishes a connection to the transmitter) from being spoofed after the file transfer is interrupted. For example, when file transfer is interrupted for 15 minutes, if a BLE address of a new connected device is changed, the transmitter can still accurately identify that a target receiver for current resumable transfer and a target receiver to which a connection is established when file transfer starts last time are the same device, and start a subsequent resumable transfer procedure.

Optionally, in an embodiment of this application, when the transmitter identifies that the target receiver for current resumable transfer and the target receiver that establishes the connection when file transfer starts last time are different devices, and exits the resumable transfer procedure, the transmitter may further display, on the file transfer interface, a prompt message indicating that the transfer fails to be resumed, to prompt the user that the transfer fails to be resumed.

Figure 9:
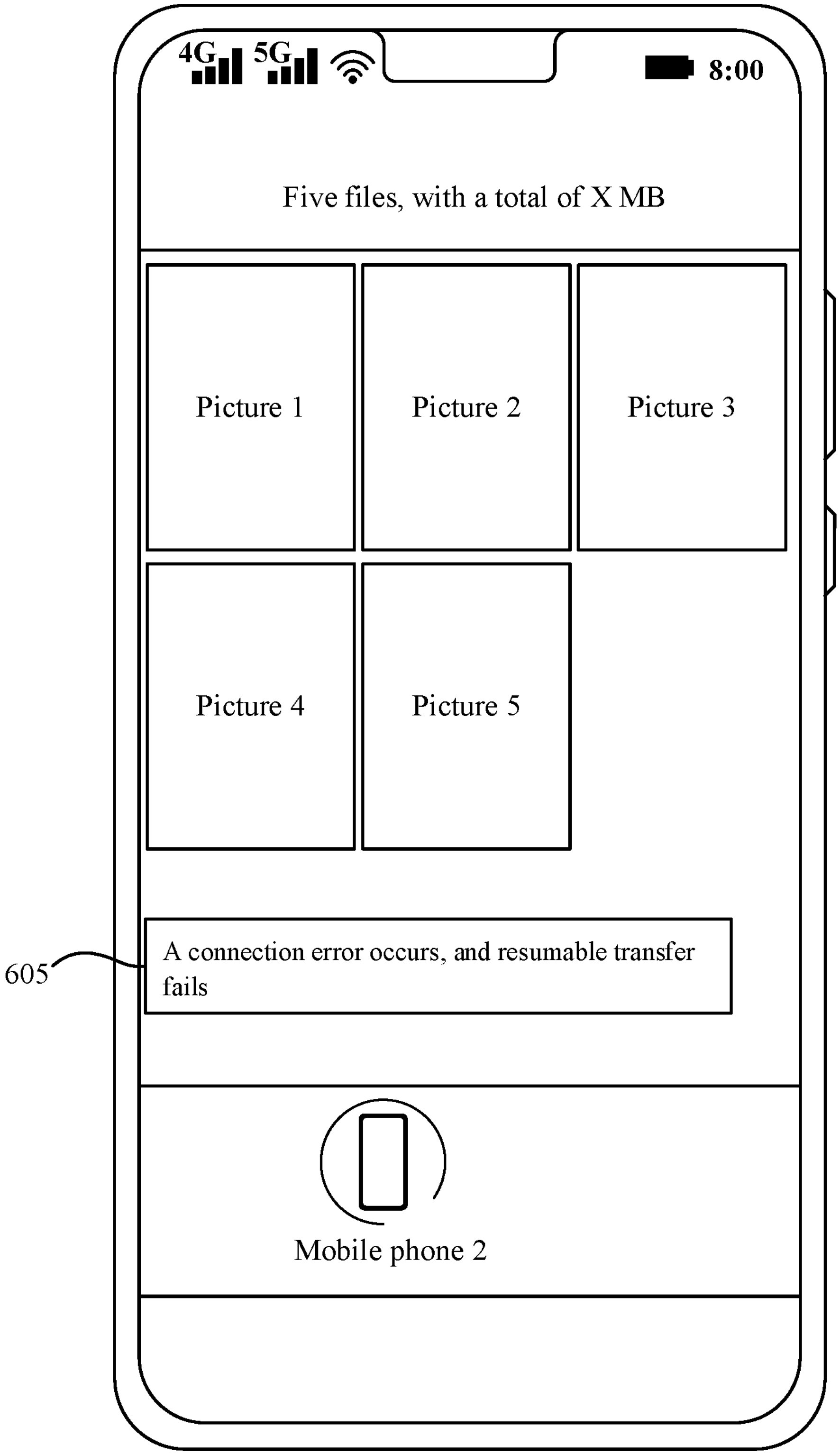
FIG. 9 is still another schematic diagram of a file transfer interface according to an embodiment of this application.

For example, FIG. 9 is still another schematic diagram of a file transfer interface according to an embodiment of this application. As shown in FIG. 9, when the transfer is resumed between the mobile phone 1 and the mobile phone 2, if the mobile phone 1 identifies that a target mobile phone for the current resumable transfer and the mobile phone 2 that establishes a connection when the file transfer starts last time are different devices, when the mobile phone 1 exits the resumable transfer procedure, a prompt message 605: "A connection error occurs, and resumable transfer fails" may be displayed on the file transfer interface, to prompt the user that the transfer fails to be resumed. It should be understood that the prompt message indicating that the transfer fails to be resumed may also be displayed by displaying a prompt box, or content of the prompt message indicating that the transfer fails to be resumed may also be other text. This is not limited herein.

The foregoing mainly describes an implementation process of the first part to the fourth part in the file transfer method provided in embodiments of this application as an example. That the transmitter exits the resumable transfer procedure mentioned in the foregoing embodiment may include: The transmitter deletes all files stored (temporarily stored) in the first buffer, and skips transferring the file to the target receiver. It should be understood that the transmitter exits the resumable transfer procedure may be that in the foregoing embodiment, the transmitter identifies a trigger condition for exiting the resumable transfer procedure and exits the resumable transfer procedure, or the user actively triggers to exit the resumable transfer procedure, for example, the user taps a resumable transfer exit button.

Optionally, in an embodiment of this application, when the transmitter exits the resumable transfer procedure, the transmitter may further send, to the target receiver based on the control channel, a prompt message indicating that the resumable transfer procedure exits. After receiving the prompt message of exiting the resumable transfer procedure, the target receiver may delete the temporary files saved by the target receiver. For example, when the transmitter performs file transfer with the target receiver, the target receiver may temporarily store the received file in the second buffer, and after receiving the entire file, copy the entire file from the second buffer to file storage space (for example, a memory). The file stored in the second buffer is a temporary file.

Optionally, in an embodiment of this application, when the transfer is resumed between the transmitter and the target receiver, and the transmitter identifies that, in files whose transfer is not completed, a file whose transfer is interrupted is changed, the transmitter may further send, to the target receiver, a prompt message indicating that the file whose transfer is interrupted is changed, where the prompt message may include change information about the file whose transfer is interrupted, and may indicate (or notify) the target receiver that the transmitter is to resend a modified file to the target receiver.

Similarly, when the transfer is resumed between the transmitter and the target receiver, and the transmitter identifies that a file whose transfer is interrupted is deleted from files whose transfer is not completed, the transmitter may also send, to the target receiver, a prompt message indicating that the file whose transfer is interrupted is deleted. The prompt message may indicate (or notify) to the target receiver that the file whose transfer is interrupted has been deleted, and the transmitter skips the file and resumes subsequent file transfer.

Optionally, after the target receiver receives, from the transmitter, the prompt message indicating that the file whose transfer is interrupted is changed, and/or the prompt message indicating that the file whose transfer is interrupted is deleted, the target receiver may delete a part of data that has been transmitted in the file whose transfer is interrupted and that is stored in the second buffer.

Optionally, in an embodiment of this application, a maximum resumable transfer tolerance time of the transmitter and a maximum resumable transfer tolerance time of the receiver may be separately pre-configured. A specific value of the maximum resumable transfer tolerance time between the transmitter and the receiver may be configured by a mobile phone manufacturer, a service provider that provides a file transfer service, or a user that uses the transmitter and the receiver. This is not limited herein. In the third part, that the transmitter performs parameter negotiation with the target receiver based on the control channel may further include: The transmitter and the target receiver negotiate a target resumable transfer tolerance time based on respective maximum resumable transfer tolerance times.

In some embodiments, a value range of the target resumable transfer tolerance time may be between a smaller value of the maximum resumable transfer tolerance time of the transmitter and the maximum resumable transfer tolerance time of the receiver and a larger value of the maximum resumable transfer tolerance time of the transmitter and the maximum resumable transfer tolerance time of the receiver.

For example, when the maximum resumable transfer tolerance time of the transmitter is less than the maximum resumable transfer tolerance time of the receiver, the target resumable transfer tolerance time may be greater than or equal to the maximum resumable transfer tolerance time of the transmitter, and less than or equal to the maximum resumable transfer tolerance time of the receiver.

For another example, when the maximum resumable transfer tolerance time of the transmitter is greater than the maximum resumable transfer tolerance time of the receiver, the target resumable transfer tolerance time may be greater than or equal to the maximum resumable transfer tolerance time of the receiver, and less than or equal to the maximum resumable transfer tolerance time of the transmitter.

For example, assuming that the maximum resumable transfer tolerance time of the transmitter is 3600 seconds, and the maximum resumable transfer tolerance time of the receiver is 7200 seconds, the transmitter and the target receiver may negotiate that the target resumable transfer tolerance time is 7200 seconds. For another example, assuming that the maximum resumable transfer tolerance time of the transmitter is permanent, and the maximum resumable transfer tolerance time of the receiver is 7200 seconds, the target resumable transfer tolerance time is permanent.

Optionally, when the maximum resumable transfer tolerance time of the transmitter is equal to the maximum resumable transfer tolerance time of the receiver, the target resumable transfer tolerance time may be equal to the maximum resumable transfer tolerance time of the transmitter or the receiver.

In this embodiment of this application, the maximum resumable transfer tolerance time of the transmitter may be referred to as a first resumable transfer tolerance time, and the maximum resumable transfer tolerance time of the receiver may be referred to as a second resumable transfer tolerance time.

In the fourth part, when file transfer is interrupted, the transmitter may locally maintain a database corresponding to the target receiver. After the transmitter senses that file transfer is interrupted, the transmitter may store first transmission information of current transfer into the database corresponding to the target receiver. The first transmission information may include at least related information of the target receiver (for example, device information or a public key of the target receiver), a file list (including an abstract and a size of each file), a file whose transfer is completed, files whose transfer is not completed (including a file whose transfer has not started and a file whose transfer is interrupted), breakpoint information, and the like. In addition, the transmitter may start a timer, where the timer is set for the target resumable transfer tolerance time. When the timer reaches the target resumable transfer tolerance time, the transmitter may delete the first transmission information stored in the database corresponding to the target receiver.

Similarly, when file transfer is interrupted, the target receiver may also locally maintain a database corresponding to the transmitter. After the target receiver senses that file transfer is interrupted, the target receiver may store second transmission information of current transfer into the database corresponding to the transmitter. The second transmission information may include: related information of the transmitter (for example, device information or a public key of the transmitter), a file list (including an abstract and a size of each file), a file whose transfer is completed, files whose transfer is not completed (including a file whose transfer has not started and a file whose transfer is interrupted), breakpoint information, a file that is not temporarily recovered, and the like. In addition, the target receiver may also start a timer, where the timer is also set for the target resumable transfer tolerance time. When the timer reaches the target resumable transfer tolerance time, the target receiver may delete the second transmission information stored in the database corresponding to the transmitter.

In other words, in this embodiment of this application, the target resumable transfer tolerance time may indicate a maximum waiting time for the transmitter and the target receiver to delete respectively buffered transfer files after the file transfer is interrupted. It should be understood that, when the target resumable transfer tolerance time is permanent, the transmitter and the target receiver may not need to separately start the timer.

For example, in an implementation, that the transmitter and the target receiver negotiate a target resumable transfer tolerance time based on respective maximum resumable transfer tolerance times may include: The transmitter sends the maximum resumable transfer tolerance time of the transmitter to the target receiver. After receiving the maximum resumable transfer tolerance time of the transmitter, the target receiver determines the target resumable transfer tolerance time based on the maximum resumable transfer tolerance time of the transmitter and the maximum resumable transfer tolerance time of the target receiver. The target receiver sends the target resumable transfer tolerance time to the transmitter. Correspondingly, the transmitter receives the target resumable transfer tolerance time.

In another implementation, that the transmitter and the target receiver negotiate a target resumable transfer tolerance time based on respective maximum resumable transfer tolerance times may also include: The target receiver sends the maximum resumable transfer tolerance time of the target receiver to the transmitter. After receiving the maximum resumable transfer tolerance time of the target receiver, the transmitter determines the target resumable transfer tolerance time based on the maximum resumable transfer tolerance time of the transmitter and the maximum resumable transfer tolerance time of the target receiver. The transmitter sends the target resumable transfer tolerance time to the target receiver. Correspondingly, the target receiver receives the target resumable transfer tolerance time.

Optionally, in an embodiment of this application, in the third part, that the transmitter performs parameter negotiation with the target receiver based on the control channel may further include: The transmitter queries whether the target receiver has a capability of supporting resumable transfer. When the target receiver has the capability of supporting resumable transfer, the transmitter performs file transfer with the target receiver in the manner described in the foregoing fourth part.

For example, the transmitter may send a resumable transfer capability query request message to the target receiver. After receiving the resumable transfer capability query request message, the target receiver may return a resumable transfer capability acknowledgment message to the transmitter. The resumable transfer capability acknowledgment message may indicate to the transmitter that the target receiver has a capability of supporting resumable transfer.

For example, that the transmitter and the receiver have a capability of supporting resumable transfer means that the transmitter and the receiver may perform file transfer according to the file transfer method in embodiments of this application. For example, for a specific device, a developer may pre-configure code required for the capability of supporting resumable transfer in the device, and the device may learn, by querying corresponding code, whether the device has the capability of supporting resumable transfer.

To make interaction logic between the transmitter and the target receiver clearer in the file transfer method provided in embodiments of this application, the following describes more specifically an interaction procedure between the transmitter and the target receiver in the foregoing embodiments with reference to FIG. 10 to FIG. 14.

Figure 10:
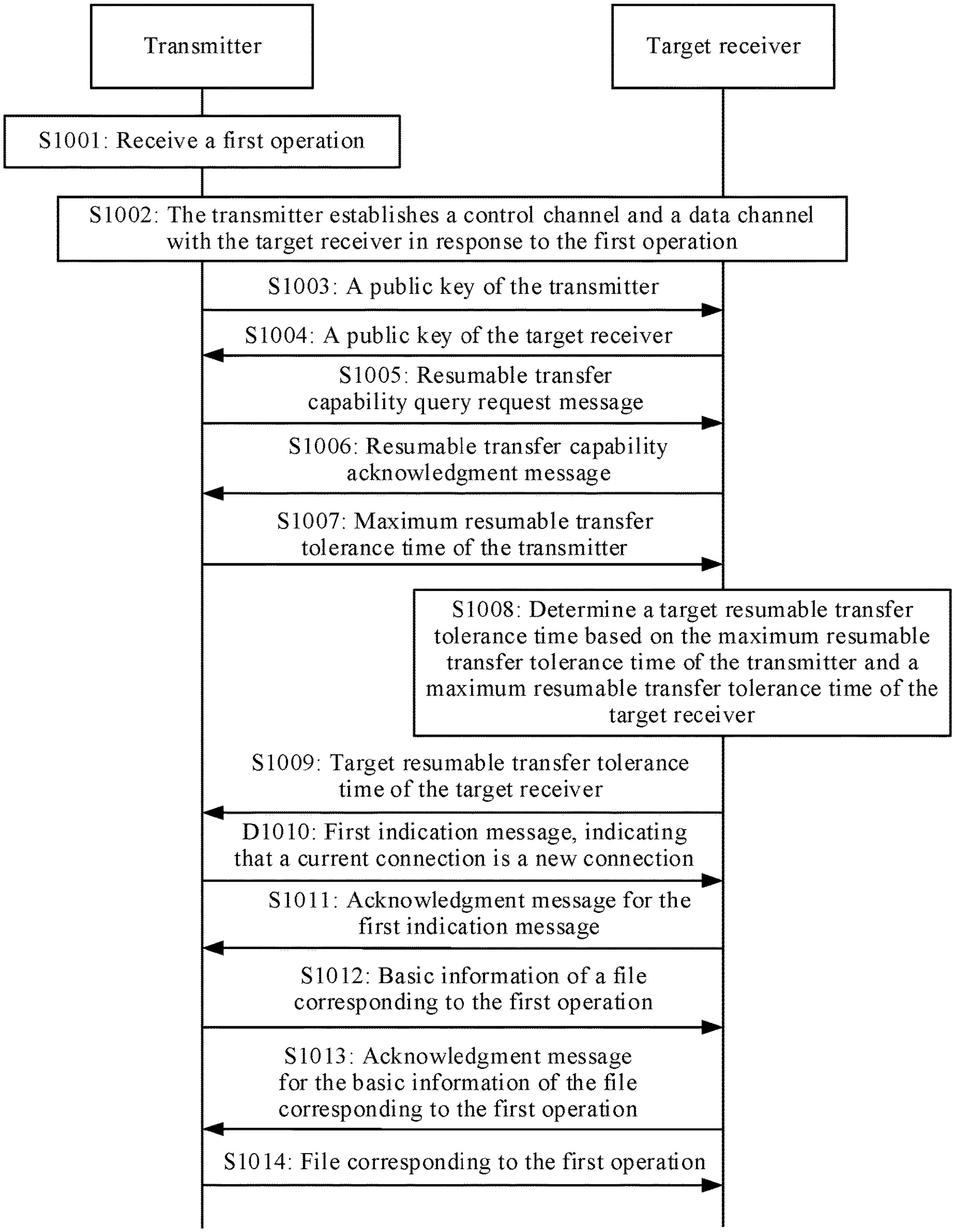
FIG. 10 is a schematic flowchart of interaction between a transmitter and a target receiver before file transfer is interrupted according to an embodiment of this application.

For example, FIG. 10 is a schematic flowchart of interaction between a transmitter and a target receiver before file transfer is interrupted according to an embodiment of this application. As shown in FIG. 10, a process of interaction between the transmitter and the target receiver before the file transfer is interrupted may include S1001 to S1014. It should be understood that before S1001, the transmitter has scanned the target receiver.

S1001: The transmitter receives a first operation.

As described above, the first operation may be an operation of a user selecting a file on the transmitter to share with the target receiver. The target receiver is one or more of the at least one receiver discovered by the transmitter through scanning in the first part.

S1002: The transmitter establishes a connection to the target receiver in response to the first operation.

As described above, the transmitter may establish a control channel and a data channel with the target receiver in response to the first operation. Then, the transmitter may perform parameter negotiation with the target receiver based on the control channel, and transfer the file to the target receiver based on the data channel. For details, refer to S1003 to S1014.

S1003: The transmitter sends a public key of the transmitter to the target receiver.

S1004: The target receiver sends a public key of the target receiver to the transmitter.

S1005: The transmitter sends a resumable transfer capability query request message to the target receiver.

S1006: The target receiver returns a resumable transfer capability acknowledgment message to the transmitter.

The resumable transfer capability acknowledgment message may indicate to the transmitter that the target receiver has a capability of supporting resumable transfer.

S1007: The transmitter sends a maximum resumable transfer tolerance time of the transmitter to the target receiver.

S1008: The target receiver determines a target resumable transfer tolerance time based on the maximum resumable transfer tolerance time of the transmitter and a maximum resumable transfer tolerance time of the target receiver.

S1009: The target receiver sends the target resumable transfer tolerance time to the transmitter.

S1010: The transmitter sends a first indication message to the target receiver, where the first indication message indicates that the current connection is a new connection.

S1011: The target receiver returns an acknowledgment message for the first indication message to the transmitter.

S1012: The transmitter sends, to the target receiver, basic information of the file corresponding to the first operation.

S1013: The target receiver returns, to the transmitter, an acknowledgment message for the basic information of the file corresponding to the first operation.

S1014: The transmitter sends the file corresponding to the first operation to the target receiver.

It may be understood that the process described in S1003 to S1013 may be completed based on the control channel, and the process described in S1014 may be completed based on the data channel.

In addition, it should be noted that the foregoing procedure shown in FIG. 10 is merely an example for description, and an execution sequence and logic of S1003 to S1013 are not limited in this application. For example, S1010 may be performed before S1005, or S1005 and S1010 may be performed together. For example, the resumable transfer capability query request message and the maximum resumable transfer tolerance time of the transmitter may be included in a same message for sending.

Figure 11:
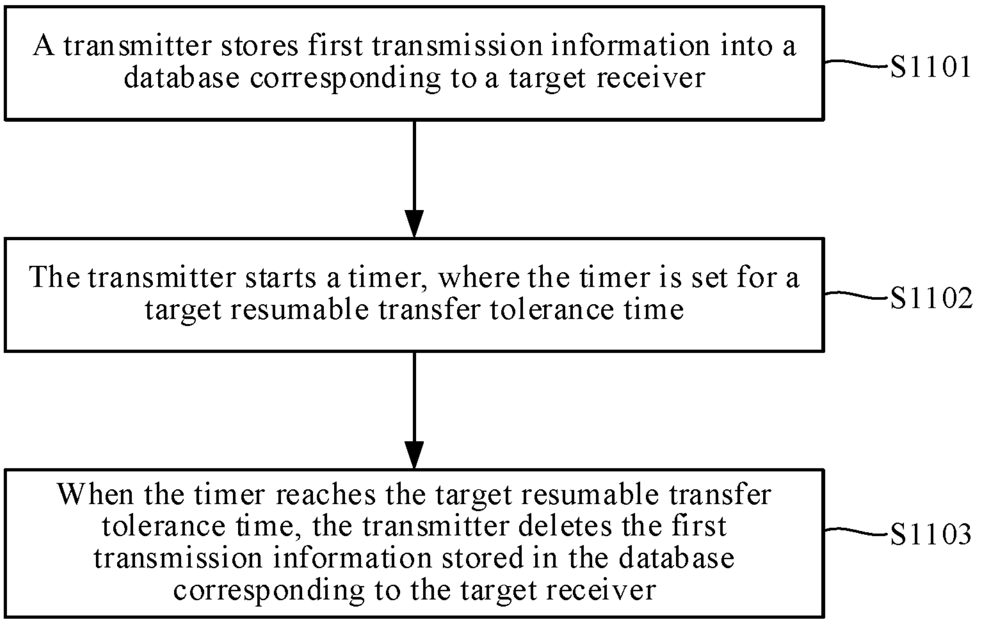
FIG. 11 is a schematic flowchart of resumable transfer control at a transmitter when file transfer is interrupted according to an embodiment of this application.

FIG. 11 is a schematic flowchart of resumable transfer control at a transmitter when file transfer is interrupted according to an embodiment of this application. As shown in FIG. 11, when file transfer is interrupted in the process in which the transmitter transfers the file corresponding to the first operation to the target receiver in S1014, a resumable transfer control procedure of the transmitter may include S1101 to S1103.

S1101: The transmitter stores first transmission information into a database corresponding to the target receiver.

The first transmission information may include at least related information of the target receiver (for example, device information or a public key of the target receiver), a file list (including an abstract and a size of each file), a file whose transfer is completed, files whose transfer is not completed (including a file whose transfer has not started and a file whose transfer is interrupted), breakpoint information, and the like.

S1102: The transmitter starts a timer, where the timer is set for a target resumable transfer tolerance time.

S1103: When the timer reaches the target resumable transfer tolerance time, the transmitter deletes the first transmission information stored in the database corresponding to the target receiver.

Figure 12:
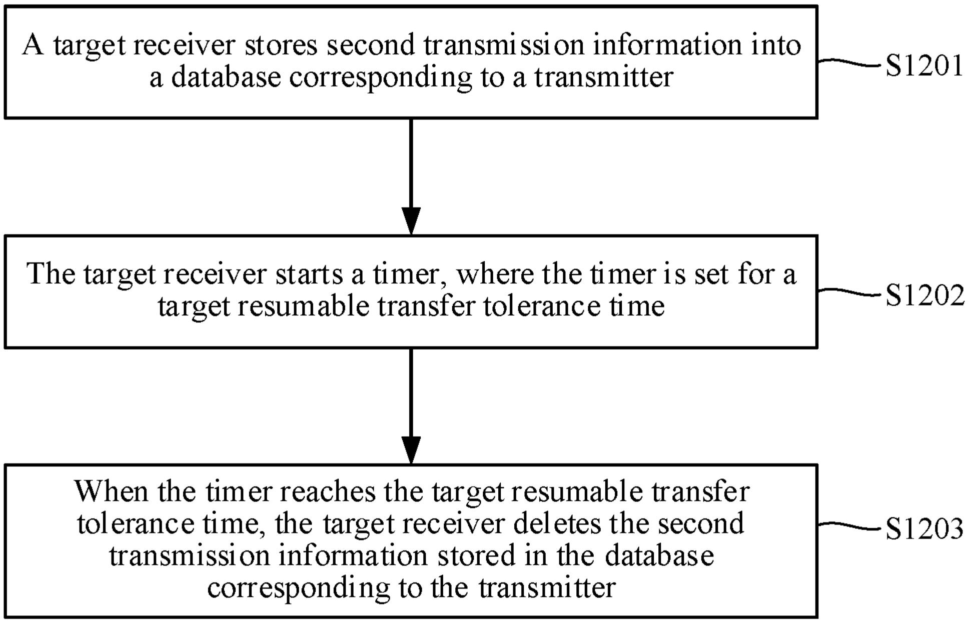
FIG. 12 is a schematic flowchart of resumable transfer control at a target receiver when file transfer is interrupted according to an embodiment of this application.

FIG. 12 is a schematic flowchart of resumable transfer control at a target receiver when file transfer is interrupted according to an embodiment of this application. As shown in FIG. 12, when file transfer is interrupted in the process in which the transmitter transfers the file corresponding to the first operation to the target receiver in S1014, a resumable transfer control procedure of the target receiver may include S1201 to S1203.

S1201: The target receiver stores second transmission information into a database corresponding to the transmitter.

The second transmission information may include at least: related information of the transmitter (for example, device information or a public key of the transmitter), a file list (including an abstract and a size of each file), a file whose transfer is completed, files whose transfer is not completed (including a file whose transfer has not started and a file whose transfer is interrupted), breakpoint information, a file that is not temporarily recovered, and the like.

S1202: The target receiver starts a timer, where the timer is set for a target resumable transfer tolerance time.

S1203: When the timer reaches the target resumable transfer tolerance time, the target receiver deletes the second transmission information stored in the database corresponding to the transmitter.

Figure 13:
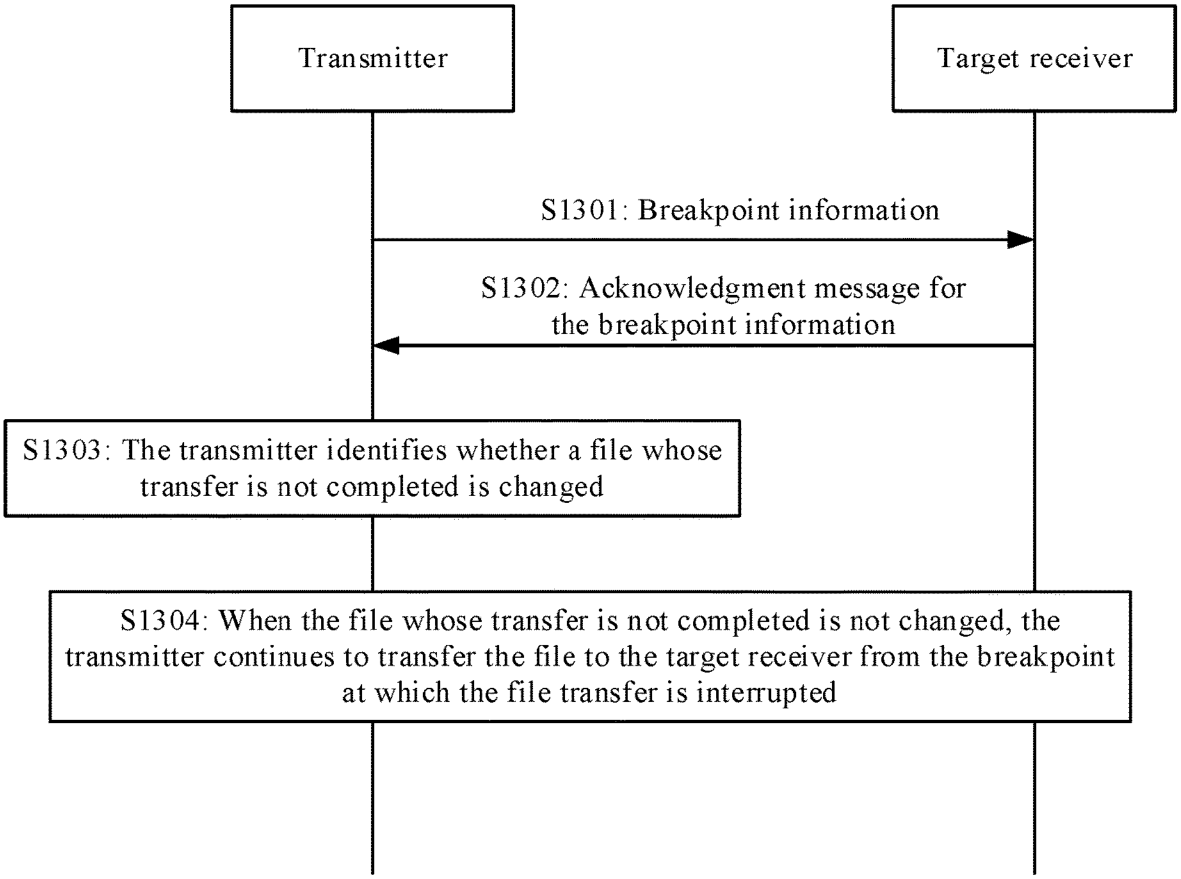
FIG. 13 is a schematic flowchart of interaction between a transmitter and a target receiver after file transfer is interrupted according to an embodiment of this application.

FIG. 13 is a schematic flowchart of interaction between a transmitter and a target receiver after file transfer is interrupted according to an embodiment of this application. As shown in FIG. 13, in a process in which the transmitter and the target receiver respectively resume the transfer control based on the procedures shown in FIG. 11 and FIG. 12, when the timer does not reach a target resumable transfer tolerance time, when the transfer is resumed between the transmitter and the target receiver, for a case in which file transfer is interrupted but the transmitter is not disconnected from the target receiver, an interaction procedure between the transmitter and the target receiver may include S1301 to S1304.

S1301: The transmitter sends breakpoint information to the target receiver.

S1302: The target receiver returns an acknowledgment message for the breakpoint information to the transmitter.

S1303: The transmitter identifies whether a file whose transfer is not completed is changed.

S1304: When the file whose transfer is not completed is not changed, the transmitter continues to transfer the file to the target receiver from a breakpoint at which the file transfer is interrupted.

Figure 14:
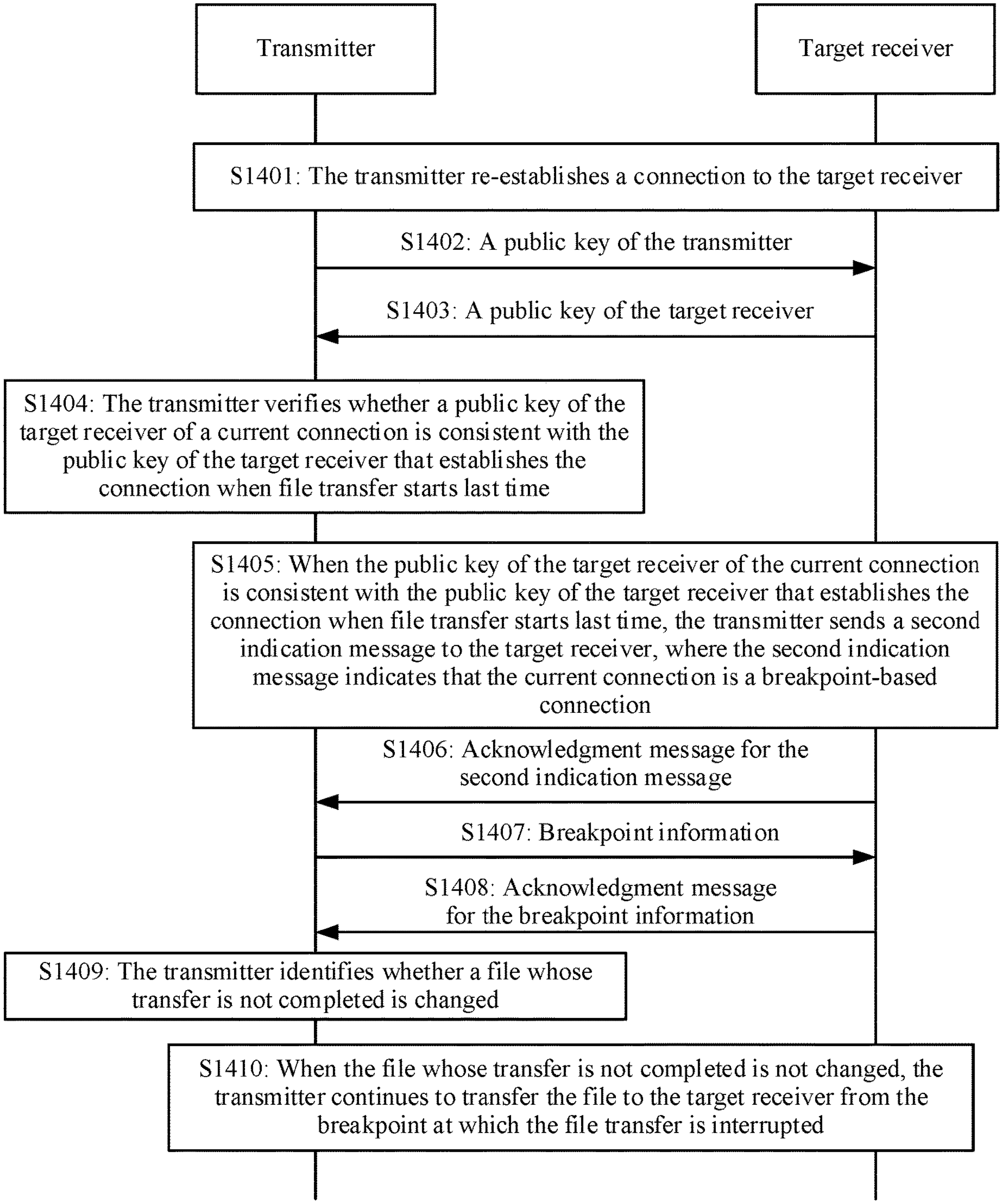
FIG. 14 is another schematic flowchart of interaction between a transmitter and a target receiver after file transfer is interrupted according to an embodiment of this application.

FIG. 14 is another schematic flowchart of interaction between a transmitter and a target receiver after file transfer is interrupted according to an embodiment of this application. As shown in FIG. 14, in a process in which the transmitter and the target receiver respectively resume the transfer control based on the procedures shown in FIG. 11 and FIG. 12, when the timer does not reach a target resumable transfer tolerance time, when the transfer is resumed between the transmitter and the target receiver, for a case in which file transfer is interrupted but the transmitter is not disconnected from the target receiver, an interaction procedure between the transmitter and the target receiver may include S1401 to S1410.

S1401: The transmitter re-establishes a connection to the target receiver.

S1402: The transmitter sends a public key of the transmitter to the target receiver.

S1403: The target receiver sends a public key of the target receiver to the transmitter.

S1404: The transmitter verifies whether a public key of the target receiver of a current connection is consistent with the public key of the target receiver that establishes the connection when file transfer starts last time.

S1405: When the public key of the target receiver of the current connection is consistent with the public key of the target receiver that establishes the connection when file transfer starts last time, the transmitter sends a second indication message to the target receiver, where the second indication message indicates that the current connection is a breakpoint-based connection.

S1406: The target receiver returns an acknowledgment message for the second indication message to the transmitter.

S1407: The transmitter sends breakpoint information to the target receiver.

S1408: The target receiver returns an acknowledgment message for the breakpoint information to the transmitter.

S1409: The transmitter identifies whether a file whose transfer is not completed is changed.

S1410: When the file whose transfer is not completed is not changed, the transmitter continues to transfer the file to the target receiver from a breakpoint at which the file transfer is interrupted.

It may be understood that the process described in S1402 to S1409 may be completed based on the control channel, and the process described in S1410 may be completed based on the data channel.

In addition, it should also be noted that the foregoing procedure shown in FIG. 14 is also merely an example for description, and an execution sequence and logic of S1402 to S1409 are not limited in this application.

It should be further understood that in S1304 shown in FIG. 13 or S1410 shown in FIG. 14, when the transmitter continues to transfer a file to the target receiver from a breakpoint at which the file transfer is interrupted, if a file transfer interruption occurs again, the resumable transfer control may continue to be performed in the manner described in the foregoing embodiment. Details are not described herein again.

Optionally, FIG. 10 to FIG. 14 are merely examples of cases in which the target receiver device is not changed after the file transfer is interrupted and a file whose transfer is not completed is not changed. For a case in which the target receiver device is changed and a file whose transfer is not completed is changed, reference may be specifically made to related descriptions in the foregoing first part to fourth part, and the accompanying drawings are not used for illustration herein.

Optionally, in an embodiment of this application, when the transmitter interacts with the target receiver, the following is involved: The resumable transfer capability query request message, the resumable transfer capability acknowledgment message, the public key, the maximum resumable transfer tolerance time (or referred to as the maximum tolerance time) and the like may be exchanged by using a control packet. For example, the transmitter and the target receiver may send a control packet to each other to establish a control channel and a data channel, negotiate a related parameter in the control channel, and the like.

Figure 15:
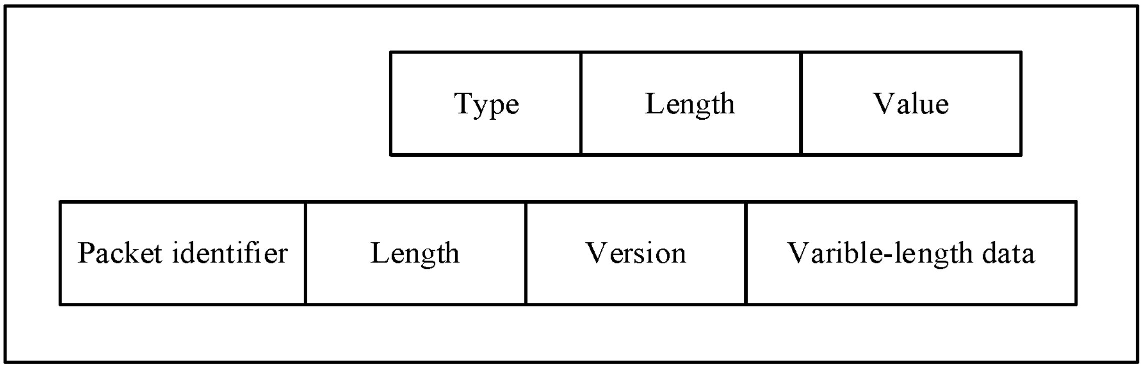
FIG. 15 is a schematic diagram of a format of a control packet according to an embodiment of this application.

For example, FIG. 15 is a schematic diagram of a format of a control packet according to an embodiment of this application. As shown in FIG. 15, the control packet may include content of the control packet: a type, a length (len) of the type, a value, and an attribute of the control packet: a packet identifier (cmdID), an entire length of the control packet, a version, and an optional tag length value (optional TLV). The optional TLV is also referred to as variable-length data.

Specific descriptions of the cmdID, the length, the version, and the TLV are shown in Table 1.

TABLE 1

| Attribute | Length | Description |
|---|---|---|
| cmdID | 1 byte | Packet identifier, used to indicate a control negotiation phase, for example:<br>Negotiation on whether two parties support resumable transfer.<br>Resumable transfer parameter negotiation procedure.<br>Data channel establishment process. |
| Length | 2 byte | Indicates the entire length. |
| Version | 1 byte | Version |
| TLV | Variable length | Indicates that variable-length data is carried. |

Specific descriptions of the type, len, and value are shown in Table 2.

TABLE 2

| Type | Description | Len | Value |
|---|---|---|---|
| 0 | Whether to support resumable transfer | 1 byte | 1: Supported<br>0: Not supported |
| 1 | Maximum tolerance time | 4 byte | 0-0xffff |
| 2 | Supported channel types | 4 byte | Supported by bit, and multiple options can be selected.<br>1: BT is supported.<br>2: BLE broadcast<br>3: BLE connection<br>4: P2P connection<br>5: Wi-Fi connection |
| 3 | Local IP address | 4 byte | Local IP address, used to identify whether the IP address is reachable. |
| 4 | Indicates whether a breakpoint exists. | 1 byte | 1: Exist<br>0: Not exist |
| 5 | File list | Variable | File list length variable |
| 6 | Communication address | Variable | Data addresses such as an IP address and a port |
| 7 | Channel list | Variable | List of supported channels |
| 8 | Key | Variable | Public and private keys |
| 9 | Exit resumable transfer | 1 byte | 1: Exit |
| . . . | | | |

Optionally, in an embodiment of this application, in a process of file transfer between the transmitter and the target receiver, a state in which file transfer is interrupted may be referred to as a waiting-for-resumable transfer state. When the transmitter enters the waiting-for-resumable transfer state, the transmitter may monitor the target receiver, a file list, a file number (like a file name), a file breakpoint, and the like; and identify whether a file whose transfer is not completed is changed (a specific identification manner is the same as that in the foregoing embodiment). When the case in the foregoing embodiment in which the file whose transfer is not completed is changed occurs, the transmitter may identify, in the file list, specific information about a change of the file whose transfer is not completed. For example, the transmitter may add a status flag for each file node (the file node may be a file or a folder) in the file list, where the status flag is used to identify whether the file node is changed and a change status. For example, when the file node is a specific file, the status flag may identify whether the file is deleted or whether the file is changed. When the transfer is resumed between the transmitter and the target receiver, the transmitter may directly determine, based on the file list, whether a file whose transfer is not completed is changed, to determine whether to resume the transfer or send a related prompt message to the user. For example, the transmitter may determine, based on a status flag identified in the file list, whether a file whose transfer is not completed is changed.

That is, in this embodiment, a process in which the transmitter identifies whether the file whose transfer is not completed is changed may be implemented, in the waiting-for-resumable transfer state, by monitoring the target receiver, the file list, the file number (for example, the file name), the file breakpoint position, and the like.

Figure 16:
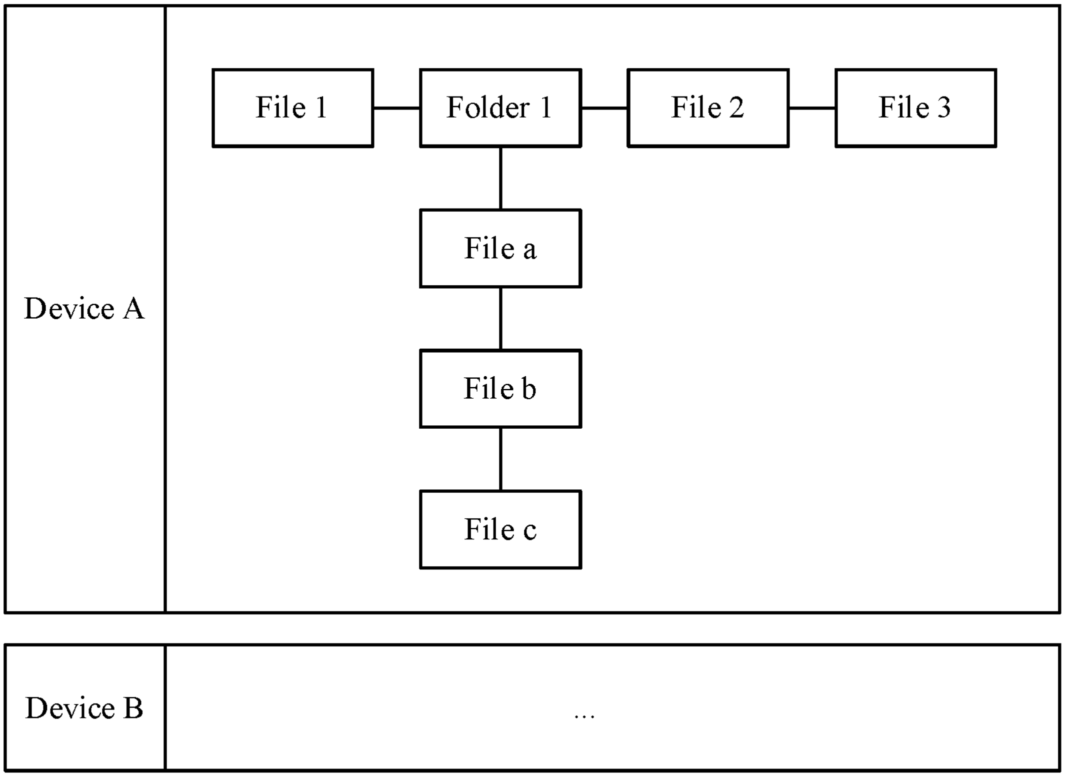
FIG. 16 is a schematic diagram of a file list according to an embodiment of this application.

For example, FIG. 16 is a schematic diagram of a file list according to an embodiment of this application. As shown in FIG. 16, for example, a transmitter is a device A, a target receiver is a device B, a file list formed by files transferred by the device A to the device B includes a file 1, a folder 1, a file 2, and a file 3, and the folder 1 includes a file a, a file b, and a file c. It is assumed that when the file transfer is interrupted, a breakpoint is the moth byte of the file 2, and 20% of the file 2 has been transferred. In this case, the device 1 may start to monitor the file list shown in FIG. 16 after the transfer is interrupted. When a file node is changed, the device 1 may modify a status flag corresponding to the file node in the file list shown in FIG. 16. For example, when the file 2 is changed, the device 1 may modify the status flag corresponding to the file 2 as: The file 2 has been changed. For another example, when the file 2 is deleted, the device 1 may change the status flag corresponding to the file 2 as: The file 2 has been deleted.

Optionally, when the transmitter enters the waiting-for-resumable transfer state, if the transmitter receives an operation of deleting a file in the file list by an end user, the transmitter may further display a prompt message indicating that the file is being shared. For example, when the user deletes the file 2, the prompt message may be: "File 2 is being shared". When the transmitter displays a prompt message indicating that the file is being shared, the transmitter may also display options such as a cancel button, a delete only button, a delete and exit resumable transfer button, and the user may tap the cancel button to trigger the transmitter to cancel deleting the file. Alternatively, the user may tap the delete only button to trigger the transmitter to delete only the file, or tap the delete and resumable transfer exit button to trigger the transmitter to delete the file and exit the resumable transfer procedure.

That is, when the transmitter receives an operation of deleting a third file (for example, the file 2), the third file is a file that needs to continue to be transferred, and the transmitter may display a first prompt message, where the first prompt message prompts that the third file is being shared. For example, "File 2 is being shared" is the first prompt message.

Optionally, when the transmitter monitors the file list, if the file whose transfer is completed is changed, the transmitter may further modify, in the file list, a status flag corresponding to a file node in which the file whose transfer is completed is located, and notifies the target receiver of specific change information of the file whose transfer is completed. After the target receiver receives the specific change information of the file whose transfer is completed, if the file whose transfer is completed is still located only in the memory (for example, the second buffer) of the target receiver, the target receiver may delete the file or do not process the file. If the file whose transfer is completed has been imported to a specified directory (for example, a root directory or a file directory of an application), the target receiver may not process the file.

Alternatively, the target receiver may temporarily not import the received file into the specified directory, but temporarily store the received file in a temporary directory. After all files in the file list are transferred, the target receiver may import all files in the temporary directory into the specified directory. In this scenario, after receiving the specific change information of the file whose transfer is completed, the target receiver may delete the file.

In other words, in this embodiment of this application, when the to-be-transferred file is changed, the transmitter may identify, in the file list, change information about the to-be-transferred file. The transmitter may further send, to the receiver, the change information about the to-be-transferred file. The receiver may adjust the file in the second buffer based on the change information about the to-be-transferred file.

In some possible scenarios, after a file is transferred from the transmitter to the target receiver, a name of the transferred file may conflict with a name of an existing file in a specified directory of the target receiver, or content of the transferred file may be consistent with content of the existing file in the specified directory of the target receiver. In this embodiment of this application, when the transmitter and the target receiver start to perform file transfer, the target receiver may first import the file list in the specified directory into the memory, and then compare, in the memory, the transferred file with the file list in the specified directory. If a name conflict occurs, the target receiver may rename the transferred file or the conflicting file in the specified directory in advance. If content of the files is consistent, the target receiver may delete the transferred file to avoid duplication.

For example, the target receiver may determine, by comparing a hash value of the transferred file with a file in the specified directory, whether content of the files is consistent. If the hash values are the same, the files are consistent. If the hash values are different, the files are inconsistent.

Optionally, in an embodiment of this application, when the transmitter performs file transfer with the target receiver, if the user switches the display interface of the transmitter from the file transfer interface to another interface (for example, a home interface of the mobile phone), in this case, the transmitter may display a floating control (for example, a floating ball) on another interface, and the user may tap the floating control to trigger the transmitter to display the file transfer interface again.

Optionally, when the user taps identification information of another receiver on the file transfer interface, the transmitter may trigger a new file transfer procedure in response to an operation of the user tapping the identification information of the another receiver. The principle is the same as the file transfer procedure between the transmitter and the target receiver in the foregoing embodiment.

It should be further noted that the file transfer method provided in this embodiment of this application may be further applicable to a far-field P2P file transfer scenario, a terminal-cloud (like a terminal device and a cloud server) file transfer scenario, and the like. This is not limited herein.

It should be understood that the foregoing embodiments are merely example descriptions of the file transfer method provided in embodiments of this application. In some other possible implementations, some execution steps may also be deleted or added in the foregoing embodiments, or a sequence of some steps in the foregoing embodiments may also be adjusted. This is not limited in this application.

Corresponding to the file transfer method in the foregoing embodiment, an embodiment of this application provides a file transfer apparatus. The apparatus may be applied to a transmitter, and is configured to implement steps that can be implemented by the transmitter in the file transfer method in the foregoing embodiment. The function of the apparatus may be implemented by hardware, or may be implemented by hardware executing corresponding software. The hardware or the software includes one or more modules or units corresponding to the foregoing functions.

Figure 17:
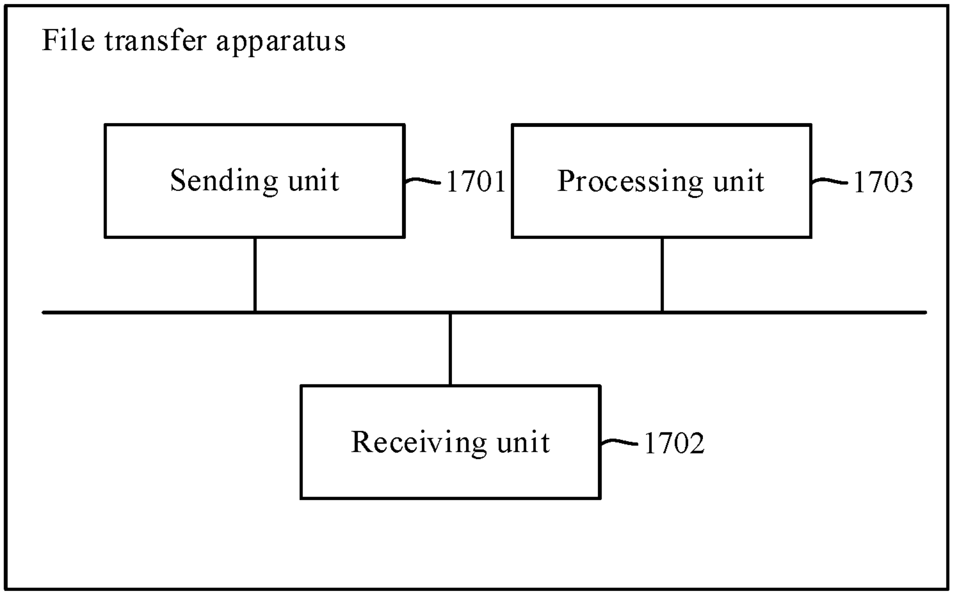
FIG. 17 is a schematic diagram of a structure of a file transfer apparatus according to an embodiment of this application.

For example, FIG. 17 is a schematic diagram of a structure of a file transfer apparatus according to an embodiment of this application. As shown in FIG. 17, the apparatus may include a sending unit 1701, a receiving unit 1702, and a processing unit 1703. The sending unit 1701, the receiving unit 1702, and the processing unit 1703 may be configured to cooperate to implement the steps performed by the transmitter in the file transfer method described in the foregoing embodiment. For example, the sending unit may be configured to send data to a receiver, the receiving unit may be configured to receive data from the receiver, and the processing unit may be configured to identify a device change, a file change, and the like.

It should be understood that the apparatus may further include another module or unit configured to implement the steps performed by the transmitter in the file transfer method described in the foregoing embodiment, for example, a display unit. This is not shown one by one herein.

Optionally, an embodiment of this application further provides a file transfer apparatus. The apparatus may be applied to a receiver, and is configured to implement steps that can be implemented by the receiver in the file transfer method described in the foregoing embodiment. The function of the apparatus may be implemented by hardware, or may be implemented by hardware executing corresponding software. The hardware or the software includes one or more modules or units corresponding to the foregoing functions. For example, the apparatus may alternatively include a sending unit, a receiving unit, a processing unit, and the like. The sending unit, the receiving unit, and the processing unit may be configured to cooperate to implement the steps performed by the receiver in the file transfer method described in the foregoing embodiment. Details are not described herein again.

It should be understood that division of units (or referred to as modules) in the foregoing apparatus is merely division of logical functions, and in actual implementation, all or some of the units may be integrated into one physical entity, or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware.

For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the units in the foregoing apparatus may be one or more integrated circuits configured to implement the foregoing methods, for example, one or more application-specific integrated circuits (ASIC), or one or more digital signal processors (DSP), or one or more field programmable gate arrays (FPGA), or a combination of at least two of these integrated circuit forms.

For another example, when the units in the apparatus may be implemented in a form of scheduling a program by the processing element, the processing element may be a general-purpose processor, for example, a central processing unit (CPU) or another processor that can invoke the program. For another example, the units may be integrated together and implemented in a form of a system-on-a-chip (SOC).

In an implementation, the units used by the foregoing apparatus to implement corresponding steps in the foregoing methods may be implemented in a form of scheduling a program by the processing element. For example, the apparatus may include a processing element and a storage element, and the processing element invokes a program stored in the storage element, to perform the method described in the foregoing method embodiments. The storage element may be a storage element located on a same chip as the processing element, that is, an on-chip storage element.

In another implementation, the program for performing the foregoing methods may be on a storage element located on a different chip from the processing element, that is, an off-chip storage element. In this case, the processing element invokes or loads a program to the on-chip storage element from the off-chip storage element, to invoke and perform the steps performed by the transmitter or the receiver in the method according to the foregoing method embodiments.

For example, an embodiment of this application may further provide an apparatus, for example, an electronic device. The electronic device may include a processor, a memory, and computer programs. The computer program is stored in the memory. When the computer program is executed by the processor, the electronic device is enabled to implement the steps performed by the transmitter or the receiver in the file transfer method described in the foregoing embodiment. The memory may be located inside the electronic device, or may be located outside the electronic device. There are one or more processors.

For example, the electronic device may be a terminal device, for example, a mobile phone, a large screen (like a smart screen), a tablet computer, a wearable device (like a smart watch or a smart band device), a television, a vehicle-mounted device, or an augmented reality (AR)/virtual reality (VR) device, a notebook computer, an ultra-mobile personal computer (UMPC), a netbook, a personal digital assistant (PDA), and the like.

In still another implementation, a unit of the apparatus for implementing the steps in the foregoing method may be configured as one or more processing elements. The processing element herein may be an integrated circuit, for example, one or more ASICs, one or more DSPs, one or more FPGAs, or a combination of the integrated circuits. The integrated circuits may be integrated together to form a chip.

For example, an embodiment of this application further provides a chip, and the chip may be applied to the foregoing electronic device. The chip includes one or more interface circuits and one or more processors. The interface circuit and the processor are interconnected by using a line. The processor receives and executes computer instructions from the memory of the electronic device by using the interface circuit, to implement the steps performed by the transmitter or the receiver in the file transfer method described in the foregoing embodiment.

An embodiment of this application further provides a computer program product, including computer-readable code. When the computer-readable code is run in an electronic device, the electronic device is enabled to implement the steps performed by the transmitter or the receiver in the file transfer method described in the foregoing embodiment.

The foregoing descriptions of implementations allow a person skilled in the art to clearly understand that, for the purpose of convenient and brief description, division of the foregoing functional modules is used as an example for illustration. In actual application, the foregoing functions can be allocated to different modules and implemented according to a requirement, that is, an inner structure of an apparatus is divided into different functional modules to implement all or some of the functions described above.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium.

Based on such an understanding, the technical solutions of embodiments of this application essentially, or the part contributing to the conventional technology, or all or some of the technical solutions may be implemented in a form of a software product, for example, a program. The software product is stored in a program product, for example, a computer-readable storage medium, and includes several instructions for instructing a device (which may be a single-chip microcomputer, a chip, or the like) or a processor to perform all or some of the steps of the methods described in embodiments of this application. The foregoing storage medium includes any medium that can store program code, like a USB flash drive, a removable hard disk, a ROM, a RAM, a magnetic disk, or an optical disc.

For example, an embodiment of this application may further provide a computer-readable storage medium. The computer-readable storage medium includes a computer program. When the computer program is run on an electronic device, the electronic device is enabled to implement the steps performed by the transmitter or the receiver in the file transfer method described in the foregoing embodiment.

Optionally, an embodiment of this application further provides a file transfer system, which may include a transmitter and a receiver. The transmitter establishes a near-field communication connection to the receiver. Near-field file transfer may be performed between the transmitter and the receiver according to the file transfer method described in the foregoing method embodiments. During file transfer, resumable transfer is supported.

For example, the transmitter is configured to obtain at least one to-be-transferred file, and send the to-be-transferred file to the receiver; and when file transfer is interrupted and resumed, the transmitter is configured to identify whether at least one file that needs to continue to be transferred is changed; and when the at least one file that needs to continue to be transferred is not changed, the transmitter resumes the transfer from a breakpoint at which the file transfer is interrupted.

Optionally, the transmitter is specifically configured to identify whether each of the at least one file that needs to continue to be transferred is changed, whether there is a file deleted from the at least one file that needs to continue to be transferred, and whether there is a file added to the at least one file that needs to continue to be transferred.

That the at least one file that needs to continue to be transferred is not changed includes: each of the at least one file that needs to continue to be transferred is not changed, and there is no file deleted from or added to the at least one file that needs to continue to be transferred.

Optionally, the transmitter is configured with a first resumable transfer tolerance time, and the receiver is configured with a second resumable transfer tolerance time; and the transmitter is further configured to determine, with the receiver, a target resumable transfer tolerance time based on the first resumable transfer tolerance time and the second resumable transfer tolerance time.

The target resumable transfer tolerance time is greater than or equal to a smaller value of the first resumable transfer tolerance time and the second resumable transfer tolerance time, and is less than or equal to a larger value of the first resumable transfer tolerance time and the second resumable transfer tolerance time.

When file transfer is interrupted, the transmitter stores first transmission information, where the first transmission information includes one or more of related information of the receiver, a file list of the to-be-transferred file, a file whose transfer has been completed, a file that needs to continue to be transferred, and breakpoint information. The transmitter deletes the first transmission information when interruption duration of file transfer reaches the target resumable transfer tolerance time.

Optionally, the file transfer interruption includes: the file transfer is interrupted, and the transmitter is not disconnected from the receiver; or the file transfer is interrupted, and the transmitter is disconnected from the receiver.

When the file transfer is interrupted, the transmitter is disconnected from the receiver, and the transfer is resumed, the transmitter is further configured to identify whether a receiver for starting to resume the transfer and a receiver before the file transfer is interrupted are a same device; and the transmitter is specifically configured to: when the receiver for starting to resume the transfer and the receiver before the file transfer is interrupted are the same device, resume the transfer from the breakpoint at which the file transfer is interrupted.

Similarly, in the file transfer system, the transmitter may separately implement all functions that can be implemented by the transmitter in the file transfer method according to the foregoing method embodiments, and the receiver may separately implement all functions that can be implemented by the receiver in the file transfer method according to the foregoing method embodiments. Details are not described herein again.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A file transfer method, wherein the method is applied to a transmitter, and the method comprises:

obtaining, by the transmitter, at least one to-be-transferred file, wherein the to-be-transferred file is a file to be sent to a receiver that establishes a near-field communication connection to the transmitter;

sending, by the transmitter, the to-be-transferred file to the receiver;

in response to a file transfer being interrupted, determining, by the transmitter, whether at least one file of the interrupted file transfer that has not completed transfer has changed; and in response to a determination that the at least one file of the interrupted file transfer that has not completed transfer is unchanged, resuming, by the transmitter, the transfer from a breakpoint at which the file transfer is interrupted.

2. The method according to claim 1, wherein determining, by the transmitter, whether the at least one file of the interrupted file transfer that has not completed transfer has changed comprises:

determining, by the transmitter:

whether each of the at least one file of the interrupted file transfer that had not completed transfer has changed, whether a file has been deleted from the at least one file of the interrupted file transfer that has not completed transfer, and whether a file has been added to the at least one file of the interrupted file transfer that has not completed transfer; and the determination that the at least one file of the interrupted file transfer that has not completed transfer is unchanged comprises a determination that:

each of the at least one file of the interrupted file transfer that has not completed transfer is unchanged, and no file has been deleted from or added to the at least one file of the interrupted file transfer that has not completed transfer.

3. The method according to claim 2, wherein determining, by the transmitter, whether the at least one file of the interrupted file transfer that has not completed transfer has changed comprises, for each of the at least one file of the interrupted file transfer that has not completed transfer:

determining, by the transmitter, whether a file time of the file at a start of a transfer resumption is the same as a file time of the file before sending of the to-be-transferred file to the receiver; and in response to the file time of the file at a start of the transfer resumption being the same as the file time of the file before the sending of the to-be-transferred file to the receiver, determining, by the transmitter, that the file has changed; and in response to the file time of the file at a start of the transfer resumption being different from the file time of the file before the sending of the to-be-transferred file to the receiver, determining, by the transmitter, that the file has changed.

4. The method according to claim 2, wherein determining whether the at least one file of the interrupted file transfer that has not completed transfer has changed comprises at least one of:

determining whether the at least one file of the interrupted file transfer that has not completed transfer has changed;

there are one or more files deleted from the at least one file of the interrupted file transfer that has not completed transfer; or there are one or more files added to the at least one file of the interrupted file transfer that has not completed transfer.

5. The method according to claim 1, wherein sending, by the transmitter, the to-be-transferred file to the receiver comprises:

copying, by the transmitter, the to-be-transferred file to a first buffer; and sending, by the transmitter, the to-be-transferred file in the first buffer to the receiver.

6. The method according to claim 1, wherein the method further comprises:

sending, by the transmitter, a capability query request message to the receiver; and receiving, by the transmitter, a resumable transfer capability acknowledgment message from the receiver, wherein the resumable transfer capability acknowledgment message indicates that the receiver has a capability of supporting resumable transfer.

7. The method according to claim 1, wherein:

the transmitter is configured with a first resumable transfer tolerance time;

the receiver is configured with a second resumable transfer tolerance time; and the method further comprises:

determining, by the transmitter and the receiver, a target resumable transfer tolerance time based on the first resumable transfer tolerance time and the second resumable transfer tolerance time, wherein the target resumable transfer tolerance time is greater than or equal to a smaller value of the first resumable transfer tolerance time and the second resumable transfer tolerance time, and the target resumable transfer tolerance time is less than or equal to a larger value of the first resumable transfer tolerance time and the second resumable transfer tolerance time, in response to the file transfer being interrupted, storing, by the transmitter, first transmission information, wherein the first transmission information comprises one or more of related information of the receiver, a file list of the to-be-transferred file, a file whose transfer has been completed, a file that needs to continue to be transferred, and breakpoint information, and deleting, by the transmitter, the first transmission information when interruption duration of the file transfer reaches the target resumable transfer tolerance time.

8. The method according to claim 1, wherein the transmitter comprises a file list of the to-be-transferred file, and the method further comprises:

when the to-be-transferred file is changed, identifying, by the transmitter in the file list, change information about the to-be-transferred file; and determining, by the transmitter, whether at least one file of the interrupted file transfer that has not completed transfer has changed comprises:

in response to the file transfer being interrupted, determining, by the transmitter based on the file list, whether at least one file of the interrupted file transfer that has not completed transfer has changed.

9. The method according to claim 1, wherein the near-field communication connection between the transmitter and the receiver comprises a Bluetooth connection, a Wi-Fi connection, a Zigbee connection, an infrared connection, or a USB connection.

10. The method according to claim 1, wherein the method further comprises:

receiving, by the transmitter, an operation of deleting a third file, wherein the third file is the at least one file of the interrupted file transfer that has not completed transfer; and displaying, by the transmitter, a first prompt message, wherein the first prompt message prompts that the third file is being shared.

11. An electronic device, comprising:

a processor;

a memory coupled to the processor with a computer program stored thereon, wherein, when the computer program is executed by the processor, the electronic device is enabled to perform:

obtaining, by a transmitter, at least one to-be-transferred file, wherein the to-be-transferred file is a file to be sent to a receiver that establishes a near-field communication connection to the transmitter, sending, by the transmitter, the to-be-transferred file to the receiver, in response to a file transfer being interrupted, determining, by the transmitter, whether at least one file of the interrupted file transfer that has not completed transfer has changed; and in response to a determination that the at least one file of the interrupted file transfer that has not completed transfer is unchanged, resuming, by the transmitter, the transfer from a breakpoint at which the file transfer is interrupted.

12. The electronic device according to claim 11, wherein determining, by the transmitter, whether at least one file that needs to continue to be transferred is changed comprises:

determining, by the transmitter:

whether each of the at least one file of the interrupted file transfer that had not completed transfer has changed, whether a file has been deleted from the at least one file of the interrupted file transfer that has not completed transfer, and whether a file has been added to the at least one file of the interrupted file transfer that has not completed transfer; and the determination that the at least one file of the interrupted file transfer that has not completed transfer is unchanged comprises a determination that:

each of the at least one file of the interrupted file transfer that has not completed transfer is unchanged, and no file has been deleted from or added to the at least one file of the interrupted file transfer that has not completed transfer.

13. The electronic device according to claim 12, wherein determining, by the transmitter, whether the at least one file of the interrupted file transfer that has not completed transfer has changed comprises, for each of the at least one file of the interrupted file transfer that has not completed transfer:

determining, by the transmitter, whether a file time of the file at a start of a transfer resumption is the same as a file time of the file before sending of the to-be-transferred file to the receiver; and in response to the file time of the file at a start of the transfer resumption being the same as the file time of the file before the sending of the to-be-transferred file to the receiver, determining, by the transmitter, that the file has changed; and in response to the file time of the file at a start of the transfer resumption being different from the file time of the file before the sending of the to-be-transferred file to the receiver, determining, by the transmitter, that the file has changed.

14. The electronic device according to claim 12, wherein determining whether the at least one file of the interrupted file transfer that has not completed transfer has changed comprises at least one of:

determining whether the at least one file of the interrupted file transfer that has not completed transfer has changed;

there are one or more files deleted from the at least one file of the interrupted file transfer that has not completed transfer; or there are one or more files added to the at least one file of the interrupted file transfer that has not completed transfer.

15. The electronic device according to claim 11, wherein sending, by the transmitter, the to-be-transferred file to the receiver comprises:

copying, by the transmitter, the to-be-transferred file to a first buffer; and sending, by the transmitter, the to-be-transferred file in the first buffer to the receiver.

16. The electronic device according to claim 11, wherein the computer program, when executed by the processor, further enables the electronic device to perform:

sending, by the transmitter, a capability query request message to the receiver; and receiving, by the transmitter, a resumable transfer capability acknowledgment message from the receiver, wherein the resumable transfer capability acknowledgment message indicates that the receiver has a capability of supporting resumable transfer.

17. The electronic device according to claim 11, wherein:

the transmitter is configured with a first resumable transfer tolerance time;

the receiver is configured with a second resumable transfer tolerance time; and the computer program, when executed by the processor, further enables the electronic device to perform:

determining, by the transmitter and the receiver, a target resumable transfer tolerance time based on the first resumable transfer tolerance time and the second resumable transfer tolerance time, wherein the target resumable transfer tolerance time is greater than or equal to a smaller value of the first resumable transfer tolerance time and the second resumable transfer tolerance time, and the target resumable transfer tolerance time is less than or equal to a larger value of the first resumable transfer tolerance time and the second resumable transfer tolerance time;

in response to the file transfer being interrupted, storing, by the transmitter, first transmission information, wherein the first transmission information comprises one or more of related information of the receiver, a file list of the to-be-transferred file, a file whose transfer has been completed, a file that needs to continue to be transferred, and breakpoint information; and deleting, by the transmitter, the first transmission information when an interruption duration of the file transfer reaches the target resumable transfer tolerance time.

18. The electronic device according to claim 11, wherein:

the transmitter comprises a file list of the to-be-transferred file; and the computer program, when executed by the processor, further enables the electronic device to perform:

when the to-be-transferred file is changed, identifying, by the transmitter in the file list, change information about the to-be-transferred file, and determining, by the transmitter, whether at least one file of the interrupted file transfer that has not completed transfer has changed comprises:

in response to file transfer being interrupted, determining, by the transmitter based on the file list, whether at least one file of the interrupted file transfer that has not completed transfer has changed.

19. The electronic device according to claim 11, wherein the near-field communication connection between the transmitter and the receiver comprises a Bluetooth connection, a Wi-Fi connection, a Zigbee connection, an infrared connection, or a USB connection.

20. The electronic device according to claim 11, wherein the computer program, when executed by the processor, further enables the electronic device to perform:

receiving, by the transmitter, an operation of deleting a third file, wherein the third file is the at least one file of the interrupted file transfer that has not completed transfer; and displaying, by the transmitter, a first prompt message, wherein the first prompt message prompts that the third file is being shared.

* * * * *